US012788659B2

(12) United States Patent
Knichel et al.

(10) Patent No.: US 12,788,659 B2
(45) Date of Patent: Nov. 10, 2026

(54) PATIENT POSITIONER

(71) Applicant: NuVasive, Inc., San Diego, CA (US)

(72) Inventors: Kelli Knichel, San Diego, CA (US); Byron Riemhofer, San Diego, CA (US); Cole Douglas, San Diego, CA (US); Derek Changsrivong, San Diego, CA (US); Shane Fedon, Elfin Forest, CA (US); Michael Serra, San Diego, CA (US); Bryan Nguyen, San Diego, CA (US); Scott Albino, Plainville, CT (US); Tamas Kovacs, Burlington, CT (US)

(73) Assignee: Globus Medical Inc., Audubon, PA (US)

( * ) Notice: Subject to any disclaimer, the term of this patent is extended or adjusted under 35 U.S.C. 154(b) by 227 days.

(21) Appl. No.: 18/631,267

(22) Filed: Apr. 10, 2024

(65) Prior Publication Data

US 2024/0342037 A1 Oct. 17, 2024

Related U.S. Application Data

(60) Provisional application No. 63/495,437, filed on Apr. 11, 2023.

(51) Int. Cl.
*A61G 13/12* (2006.01)

(52) U.S. Cl.
CPC ....... *A61G 13/1285* (2013.01); *A61G 13/122* (2013.01); *A61G 13/123* (2013.01); *A61G 13/1245* (2013.01); *A61G 2210/10* (2013.01)

(58) Field of Classification Search
CPC ...... A61G 7/1051; A61G 7/10; A61G 7/1001; A61G 5/14; A61G 2203/12; A61G 2203/30; A61G 2205/60; A61G 7/1042; A61G 7/1061; A61G 7/1065; A61G 7/1078; A61G 7/1017; A61G 7/1046; A61G 7/1015; A61G 2203/40; A61G 13/08; A61G 13/04; A61G 13/0054; A61G 13/06; A61G 13/122; A61G 13/0036; A61G 13/123; G16H 40/63;
(Continued)

(56) References Cited

U.S. PATENT DOCUMENTS

| | | | | |
|---|---|---|---|---|
| 9,072,646 | B2 * | 7/2015 | Skripps | A61G 13/122 |
| 9,308,145 | B2 * | 4/2016 | Jackson | A61G 13/0054 |

(Continued)

*Primary Examiner* — Madison Matthews

(57) ABSTRACT

Patient positioners as well as methods for using patient positioners are disclosed. An example patient positioner may include a thoracic support assembly having one or more thoracic attachment members for securing the thoracic support member to a rail. The thoracic support assembly may have a thoracic adjustment mechanism configured to shift the thoracic support assembly relative to the one or more thoracic attachment members. A lumbar support assembly may be disposed adjacent to the thoracic support assembly. The lumbar support assembly may include one or more lumbar attachment members for securing the lumbar support assembly to the rail. The lumbar support assembly may include a lumbar adjustment mechanism configured to shift the lumbar support assembly relative to the one or more lumbar attachment members. A bolster may be coupled to at least one of the thoracic support assembly and the lumbar support assembly.

18 Claims, 30 Drawing Sheets

(58) Field of Classification Search
CPC .................. G16H 10/65; A61B 6/0407; A61B 2017/00022; A61B 5/704
USPC ....... 5/6, 613, 621, 617, 607, 618, 610, 601, 5/624; 24/608; 248/229.14, 316.6
See application file for complete search history.

(56) References Cited

U.S. PATENT DOCUMENTS 11,160,709 B2 * 11/2021 Jackson ................. A61G 13/04
11,813,217 B2 * 11/2023 Lim ..................... A61G 7/1055

* cited by examiner

PATIENT POSITIONER

CROSS-REFERENCE TO RELATED APPLICATIONS

This application is a non-provisional application which claims priority to provisional application Ser. No. 63/495,437, filed Apr. 11, 2023, which is incorporated by reference in its entirety herein for all purposes.

TECHNICAL FIELD

The present disclosure pertains to medical devices for use in a spinal procedure. More particularly, the present disclosure pertains to a patient positioner.

BACKGROUND

A wide variety of medical devices have been developed for various procedures including, for example, spinal procedures. Of the known medical devices, each has certain advantages and disadvantages. There is an ongoing need to provide alternative medical devices as well as alternative methods for using medical devices.

BRIEF SUMMARY

This disclosure provides design and use alternatives for medical devices. A patient positioner is disclosed. The patient positioner comprises: a thoracic support assembly having one or more thoracic attachment members for securing the thoracic support member to a rail, the thoracic support assembly having a thoracic adjustment mechanism configured to shift the thoracic support assembly relative to the one or more thoracic attachment members; a lumbar support assembly disposed adjacent to the thoracic support assembly, the lumbar support assembly including one or more lumbar attachment members for securing the lumbar support assembly to the rail; wherein the lumbar support assembly includes a lumbar adjustment mechanism configured to shift the lumbar support assembly relative to the one or more lumbar attachment members; and a bolster coupled to at least one of the thoracic support assembly and the lumbar support assembly, the bolster including a ratchet mechanism for adjusting the position of the bolster relative to the at least one of the thoracic support assembly and the lumbar support assembly.

Alternatively or additionally to any of the embodiments above, the thoracic adjustment mechanism is configured to rotate the thoracic support assembly relative to the one or more thoracic attachment members.

Alternatively or additionally to any of the embodiments above, the thoracic adjustment mechanism includes a threaded rod coupled to a pin, the pin disposed in a channel formed in the thoracic support assembly.

Alternatively or additionally to any of the embodiments above, the lumbar adjustment mechanism is configured to rotate the lumbar support assembly relative to the one or more lumbar attachment members.

Alternatively or additionally to any of the embodiments above, the lumbar adjustment mechanism includes a first threaded rod, a first carriage coupled to the first threaded rod, a second threaded rod, and a second carriage coupled to the second threaded rod.

Alternatively or additionally to any of the embodiments above, the lumbar adjustment mechanism is configured to be adjusted by at least one of rotating the first threaded rod in a first direction and rotating the second threaded rod in the first direction.

Alternatively or additionally to any of the embodiments above, the lumbar adjustment mechanism includes a first scissor link coupled to the first carriage and a second scissor link coupled to the second carriage.

Alternatively or additionally to any of the embodiments above, the lumbar adjustment mechanism includes a ball joint.

Alternatively or additionally to any of the embodiments above, the lumbar adjustment mechanism is configured to adjust a patient spine lordosis.

Alternatively or additionally to any of the embodiments above, the thoracic adjustment mechanism includes an actuator disposed adjacent to a peripheral region of the one or more thoracic attachment members.

Alternatively or additionally to any of the embodiments above, the lumbar adjustment mechanism includes an actuator disposed adjacent to a peripheral region of the one or more lumbar attachment members.

Alternatively or additionally to any of the embodiments above, further comprising a leg extension support member coupled to the lumbar support assembly.

Alternatively or additionally to any of the embodiments above, the leg extension support member is configured to rotate, translate, or both rotate and translate relative to the lumbar support assembly.

Alternatively or additionally to any of the embodiments above, the bolster includes a strap receiving region.

Alternatively or additionally to any of the embodiments above, further comprising one or more additional bolsters.

A patient positioner is disclosed. The patient positioner comprises: a thoracic support assembly, the thoracic support assembly having a thoracic attachment member and a thoracic adjustment mechanism configured to shift the thoracic support assembly relative to the thoracic attachment member; a lumbar support assembly including a lumbar attachment member, the lumbar support assembly including a lordosis adjustment member and a leg extension member, the lordosis adjustment member having a lordosis adjustment mechanism configured to shift the lordosis adjustment member relative to the lumbar attachment member; and one or more bolster coupled to the thoracic support assembly the lumbar support assembly, or both.

Alternatively or additionally to any of the embodiments above, the lordosis adjustment mechanism includes a first threaded rod and a first carriage coupled to the first threaded rod.

Alternatively or additionally to any of the embodiments above, the lordosis adjustment mechanism includes a second threaded rod and a second carriage coupled to the second threaded rod.

Alternatively or additionally to any of the embodiments above, the lordosis adjustment mechanism is configured to be adjusted by rotating the first threaded rod in a first direction, rotating the second threaded rod in the first direction, or both.

Alternatively or additionally to any of the embodiments above, the first threaded rod and the second threaded rod are independently adjustable.

Alternatively or additionally to any of the embodiments above, the lordosis adjustment mechanism includes first and second scissor links coupled to the first and second carriages.

A patient positioner is disclosed. The patient positioner comprises: a thoracic support assembly including a thoracic attachment member, the thoracic support assembly having a thoracic adjustment mechanism configured to shift the thoracic support assembly relative to the thoracic attachment member; a lumbar support assembly disposed adjacent to the thoracic support assembly, the lumbar support assembly including lumbar attachment member and a lordosis adjustment mechanism configured to shift the lumbar support assembly relative to the lumbar attachment member; a leg extension member coupled to the lumbar support assembly; one or more bolsters coupled to the thoracic support assembly, the lumbar support assembly, or both; and wherein at least one of the one or more bolsters including a ratchet mechanism.

A patient positioner is disclosed. The patient positioner comprises: a thoracic adjustment mechanism; a lordosis adjustment mechanism; and wherein the lordosis adjustment mechanism includes a first threaded rod, a first carriage coupled to the first threaded rod, a second threaded rod, and a second carriage coupled to the second threaded rod.

Alternatively or additionally to any of the embodiments above, the lordosis adjustment mechanism is configured to be adjusted by rotating the first threaded rod in a first direction, rotating the second threaded rod in the first direction, or both.

Alternatively or additionally to any of the embodiments above, the first threaded rod and the second threaded rod are independently adjustable.

Alternatively or additionally to any of the embodiments above, the lordosis adjustment mechanism includes first and second scissor links coupled to the first and second carriages.

A patient positioner is disclosed. The patient positioner comprises: a thoracic support assembly, the thoracic support assembly having a thoracic attachment member and a thoracic adjustment mechanism configured to shift the thoracic support assembly relative to the thoracic attachment member; and a lumbar support assembly including a lumbar attachment member, the lumbar support assembly including a first adjustment mechanism and a second adjustment mechanism.

Alternatively or additionally to any of the embodiments above, the first adjustment mechanism includes a lateral rotation assembly.

Alternatively or additionally to any of the embodiments above, the second adjustment mechanism includes a lordosis assembly.

Alternatively or additionally to any of the embodiments above, the lordosis assembly being configured to shift the lumbar support assembly between a first arrangement and a second arrangement.

Alternatively or additionally to any of the embodiments above, the second arraignment is a tilted arrangement.

Alternatively or additionally to any of the embodiments above, the first adjustment mechanism and the second adjustment mechanism are configured to adjust the position of a patient in two different directions.

Alternatively or additionally to any of the embodiments above, the first adjustment mechanism and the second adjustment mechanism are configured to adjust the position of a patient in two different planes.

A method for positioning patient is disclosed. The method comprises: disposing a patient along a patient positioner, the patient positioner comprising: a thoracic support assembly, the thoracic support assembly having a thoracic attachment member and a thoracic adjustment mechanism configured to shift the thoracic support assembly relative to the thoracic attachment member, and a lumbar support assembly including a lumbar attachment member, the lumbar support assembly including a lordosis adjustment member and a leg extension member, the lordosis adjustment member having a lordosis adjustment mechanism configured to shift the lordosis adjustment member relative to the lumbar attachment member; and adjusting at least one of the thoracic adjustment mechanism and the lordosis adjustment member.

The above summary of some embodiments is not intended to describe each disclosed embodiment or every implementation of the present disclosure. The Figures, and Detailed Description, which follow, more particularly exemplify these embodiments.

BRIEF DESCRIPTION OF THE DRAWINGS

The disclosure may be more completely understood in consideration of the following detailed description in connection with the accompanying drawings, in which.

Figure 1:
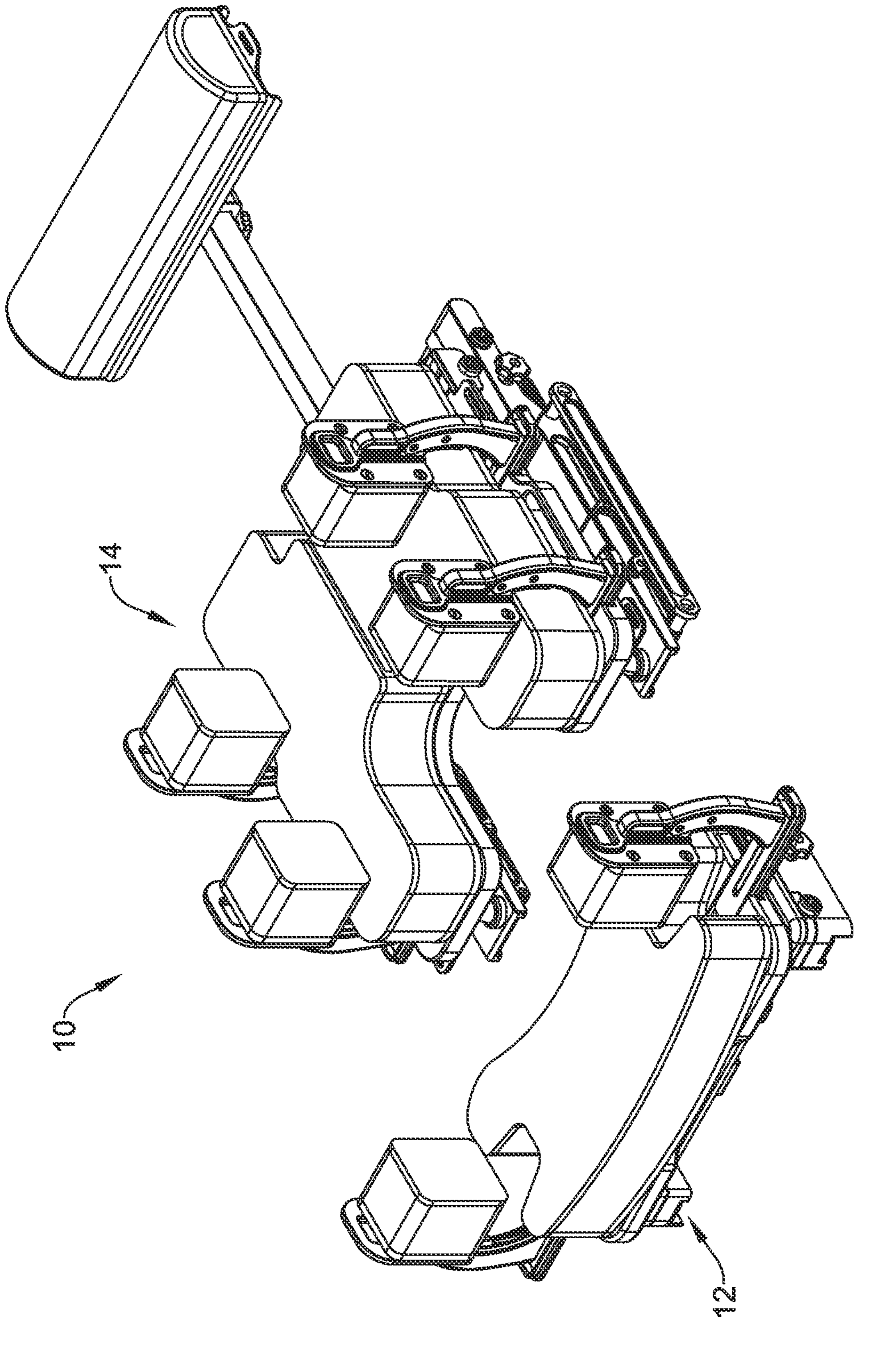
FIG. 1 is a perspective view of an example patient positioner.

While the disclosure is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following detailed description should be read with reference to the drawings in which similar elements in different drawings are numbered the same. The drawings, which are not necessarily to scale, depict illustrative embodiments and are not intended to limit the scope of the invention.

Spinal procedures including surgical spinal procedures may require precise positioning of a patient in order to successfully access target sites. In addition, it may be desirable to position a patient in a manner that resists patient during a spinal procedure. Disclosed herein is a patient positioner 10 that may be used, for example, in conjunction with a spinal procedure. The patient positioner 10, shown in FIG. 1, may aid in providing precise positioning of the patient as well as help to resist patient movement during an intervention. In general, a patient may be disposed along or otherwise lay upon the patient positioner 10. The patient positioner 10 can then be arranged to place/orient the patient in a desired position. Some additional features of the patient positioner 10 are disclosed herein.

The patient positioner 10 may include a thoracic support member or assembly 12 and a lumbar support member or assembly 14. In some instances, the thoracic support assembly 12 and the lumbar support assembly 14 may be coupled and/or attached to one another. In other instances, the thoracic support assembly 12 and the lumbar support assembly 14 may not be directly attached to one another and may be separate components of the patient positioner 10.

Figure 2:
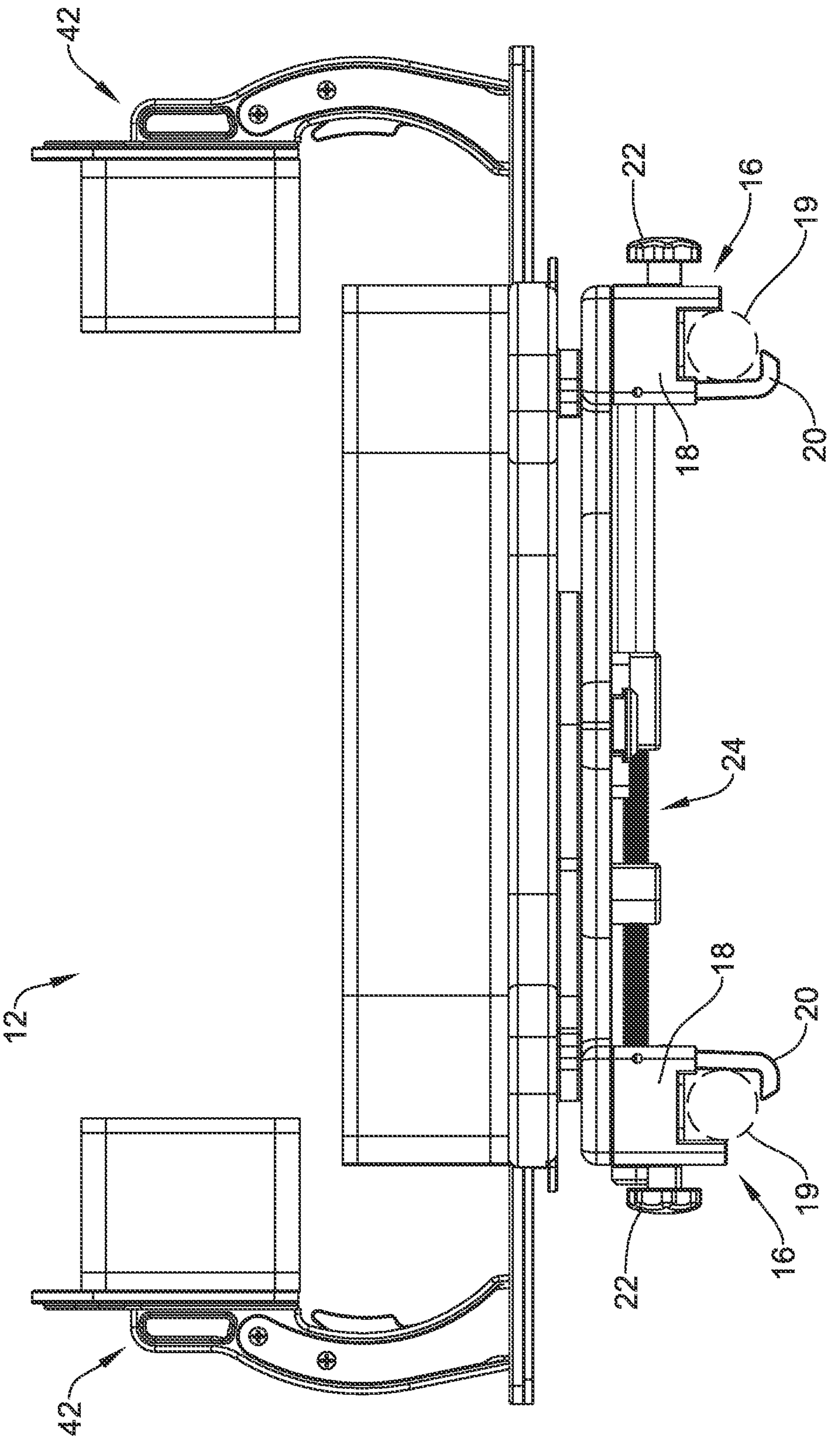
FIG. 2 is an end view of a portion of an example patient positioner.

The thoracic support assembly 12 is shown in FIG. 2. Here it can be seen that the thoracic support assembly 12 may include one or more attachment members 16 (e.g., thoracic attachment members 16), for example for securing the thoracic support assembly 12 to a rail of a medical/hospital bed. The attachment members 16 may also be termed rail clamps, bed rail clamps, and/or the like. In some instances, the thoracic support assembly 12 may include a pair of generally opposing attachment members 16. Other numbers and/or arrangements of attachment members 16 (e.g., including not directly opposing arrangements) are contemplated.

Each of the attachment members 16 may include a clamp body 18 and a clamp arm or member 20 coupled to the clamp body 18. In general, the clamp body 18 may be configured to fit onto a bed rail and the clamp arm 20 may be pivotably coupled to the clamp body 18 to help secure the clamp body 18 to the bed rail. An actuator or knob 22 may be configured to shift/pivot the clamp arm 20 relative to the clamp body 18 so as to secure the attachment member 16 to/around the rail. The actuator 22 may be positioned along the exterior or periphery of the clamp body 18 to provide for easy access by a clinician. It should be noted that in at least some instances, bed rails (shown in FIG. 2 in phantom and marked with reference number 19) are not considered to be part of the patient positioner 10, the thoracic support assembly 12, and/or the attachment member 16. Instead, bed rails are considered to be commonly used clinical or hospital equipment for spinal procedures. Thus, the attachment members 16 are designed to work in conjunction with such equipment. It can be appreciated that other attachment members 16 are contemplated that can be used to help secure the thoracic support assembly 12 to differing clinical/hospital equipment.

The thoracic support assembly 12 may include one or more thoracic adjustment mechanisms, generally denoted with reference number 24, that are configured to shift/adjust the thoracic support assembly 12, for example relative to the thoracic attachment members 16. In at least some instances, the thoracic adjustment mechanism 24 is configured to pivot the thoracic support assembly 12, rotate the thoracic support assembly 12 (e.g., relative to the thoracic attachment members 16), or both. In general, the thoracic adjustment mechanism 24 may include a number of structures that work in conjunction to allow for the thoracic support assembly 12 to be shifted/moved/rotated. At least some of the structures that allow for the adjustment of the thoracic support assembly 12 (e.g., the thoracic adjustment mechanism 24) are disclosed herein.

Figure 3:
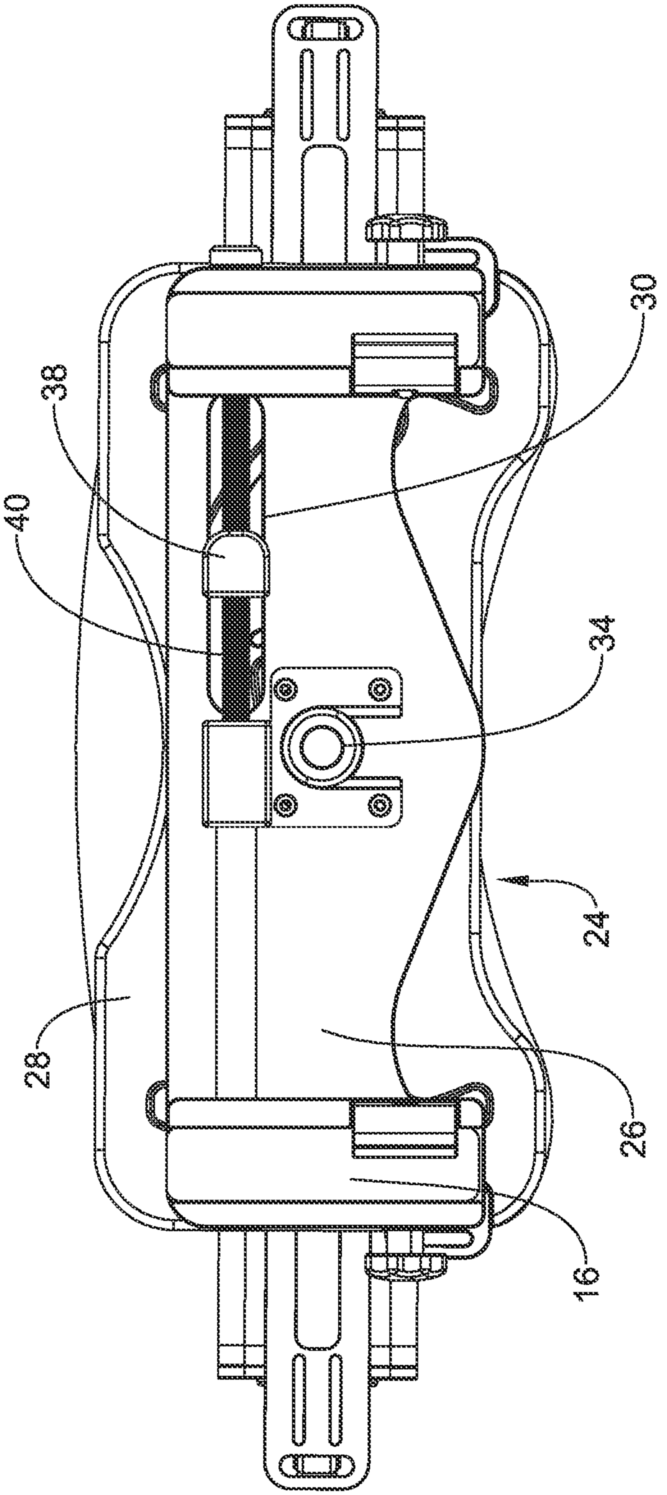
FIG. 3 is a bottom view of portion of an example patient positioner.
Figure 4:
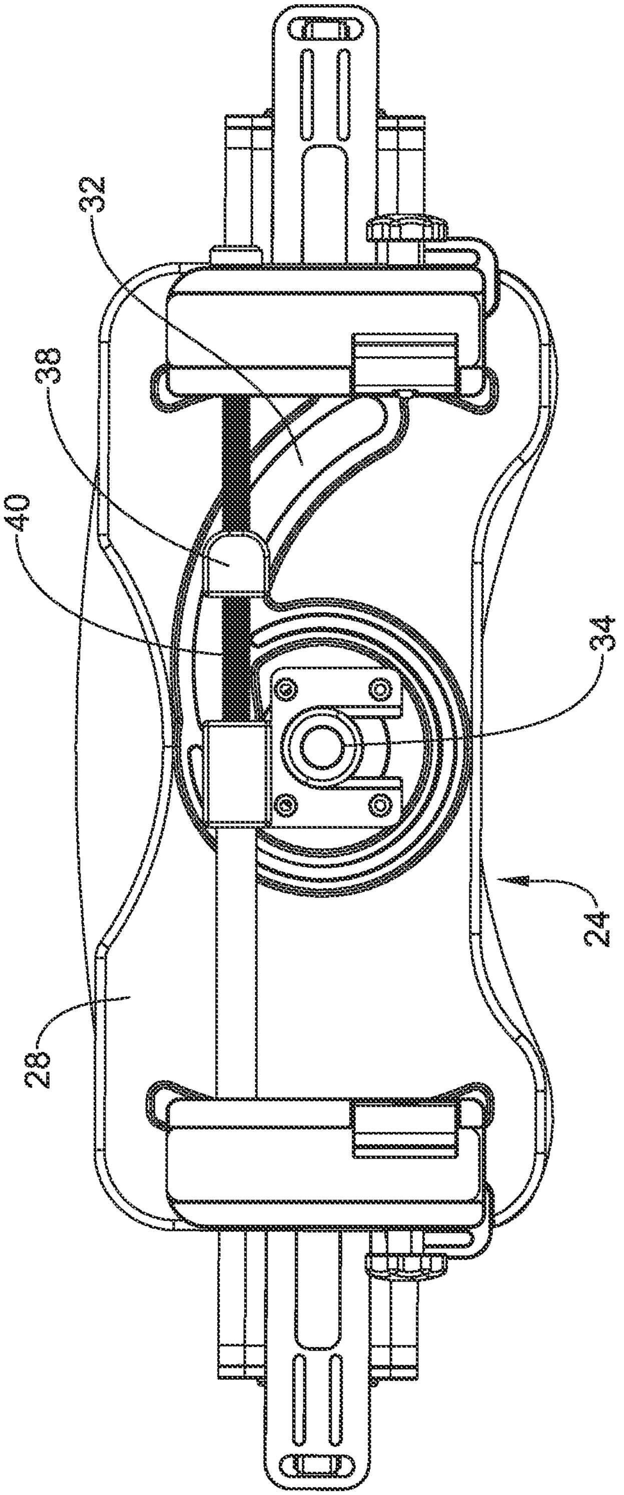
FIG. 4 is a bottom view of portion of an example patient positioner.

The thoracic support assembly 12 may include a plurality of boards or platforms such a first or bottom board 26 and a second or top board 28 as shown in FIGS. 3-4. The bottom board 26 may be fixedly coupled to the attachment member (s) 16. The top board 28 may be pivotably coupled to the bottom board 26. A pivot member or post 34 may extend through the bottom board 26 and the top board 28. The post 34 may function as a pivot point to allow the top board 28 to pivot relative to the bottom board 26. Thus, the post 34 may be part of the structural features of the thoracic support assembly 12 and/or the thoracic adjustment mechanism 24 that allow, for example, the top board 28 to pivot relative to the bottom board 26 (and/or relative to the thoracic attachment members 16).

In some of these and in other instances, the bottom board 26 may have an elongated slot 30 formed therein. The top board 28 may include an arcuate groove 32 formed therein (see, for example, FIG. 4, where the bottom board 26 is removed to more clearly see the groove 32 formed in the top board 28). A pin member 38 may extend through the elongated slot 30 in the bottom board. The pin member 38 may be engaged with the groove 32 in the top board 28. A rod 40, for example a threaded rod 40, may be coupled to (e.g., threadably engaged with) the pin member 38. Rotation of the rod 40 may cause translation of the pin member 38 along the rod 40 (and/or the slot 30). Translation of the pin member 38 causes the pin member 38 to travel within the groove 32. Because of the arcuate shape of the groove 32, translation of the pin member 38 within the groove 32 may cause the top board 28 to rotate relative to the bottom board 26. Thus, the slot 30, groove 32, pin member 38, and rod 40 may be part of the structural features of the thoracic support assembly 12 and/or the thoracic adjustment mechanism 24 that allow, for example, the top board 28 to rotate relative to the bottom board 26 (and/or relative to the thoracic attachment members 16). In some instances, the thoracic adjustment mechanism 24 may allow for the patient to be shifted in multiple directions and/or planes. For example, the thoracic adjustment mechanism 24 may allow for a patient to be rotated and also to be raised/tilted.

Figure 5:
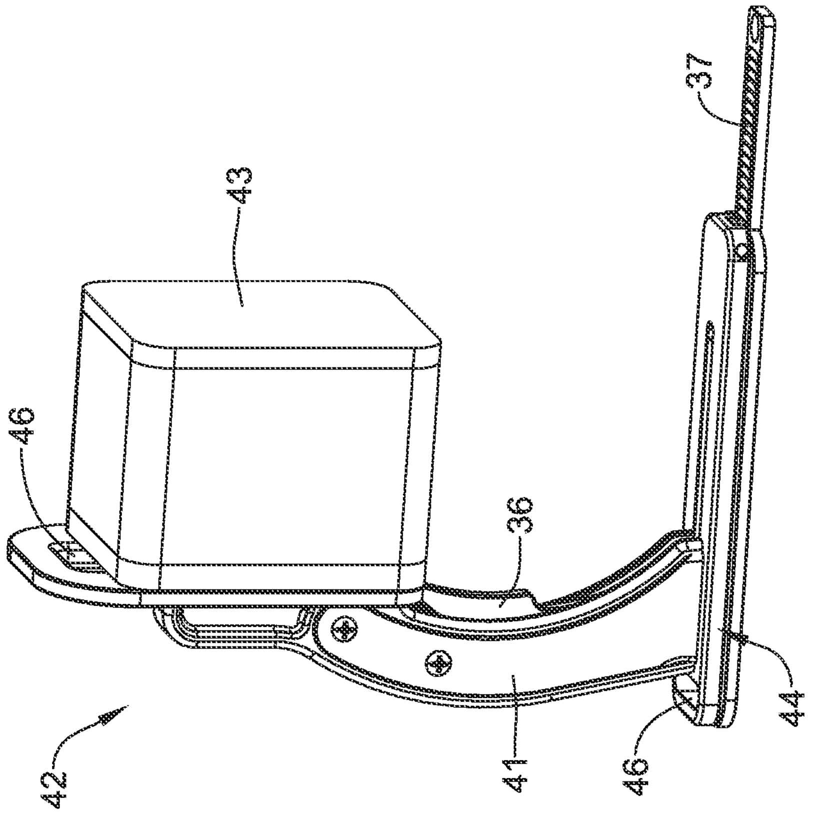
FIG. 5 is a side view of an example bolster.

One or more bolsters 42 may be coupled to the thoracic support assembly 12 as shown in FIG. 2. A perspective view of one of the bolsters 42 is shown in FIG. 5. In general, the bolsters 42 are configured to secure the position of the patient and/or otherwise help to reduce patient movement when positioned along the patient positioner 10. In some instances, one or more bolsters 42 may be slidably coupled to the top board 28. This may include one, two, three, four, or more bolsters 42 coupled to thoracic support assembly 12. Other portions of the patient positioner may alternatively or additionally include bolsters 42. The bolsters 42, by virtue of being slidably coupled to the top board 28, can be moved inward (e.g., toward/closer to) and/or outward (e.g., away from) the top board 28. In some instances, one, two, three, four, or more bolsters 42 may also be coupled to lumbar support assembly 14.

The bolsters 42 may include an arm region 41, a patient support region 43 coupled to and/or otherwise extending from the arm region 41, and a base or attachment region 44. The patient support region 43 may comprise a pad or padded support that generally is arranged to contact a patient. A strap holding member or region 46 may be disposed along or otherwise adjacent to the arm region 41. The strap holding region 46 may, as the name suggests, be used to accommodate a strap used to secure the patient. A rack or toothed section 37 may be disposed adjacent to the base 44. In some instances, the rack 37 may be slidably coupled to the base 44. In some of these and in other instances, the rack 37 may be secured to and/or securable to the thoracic support assembly 12 (e.g., the top board 28).

Figure 6:
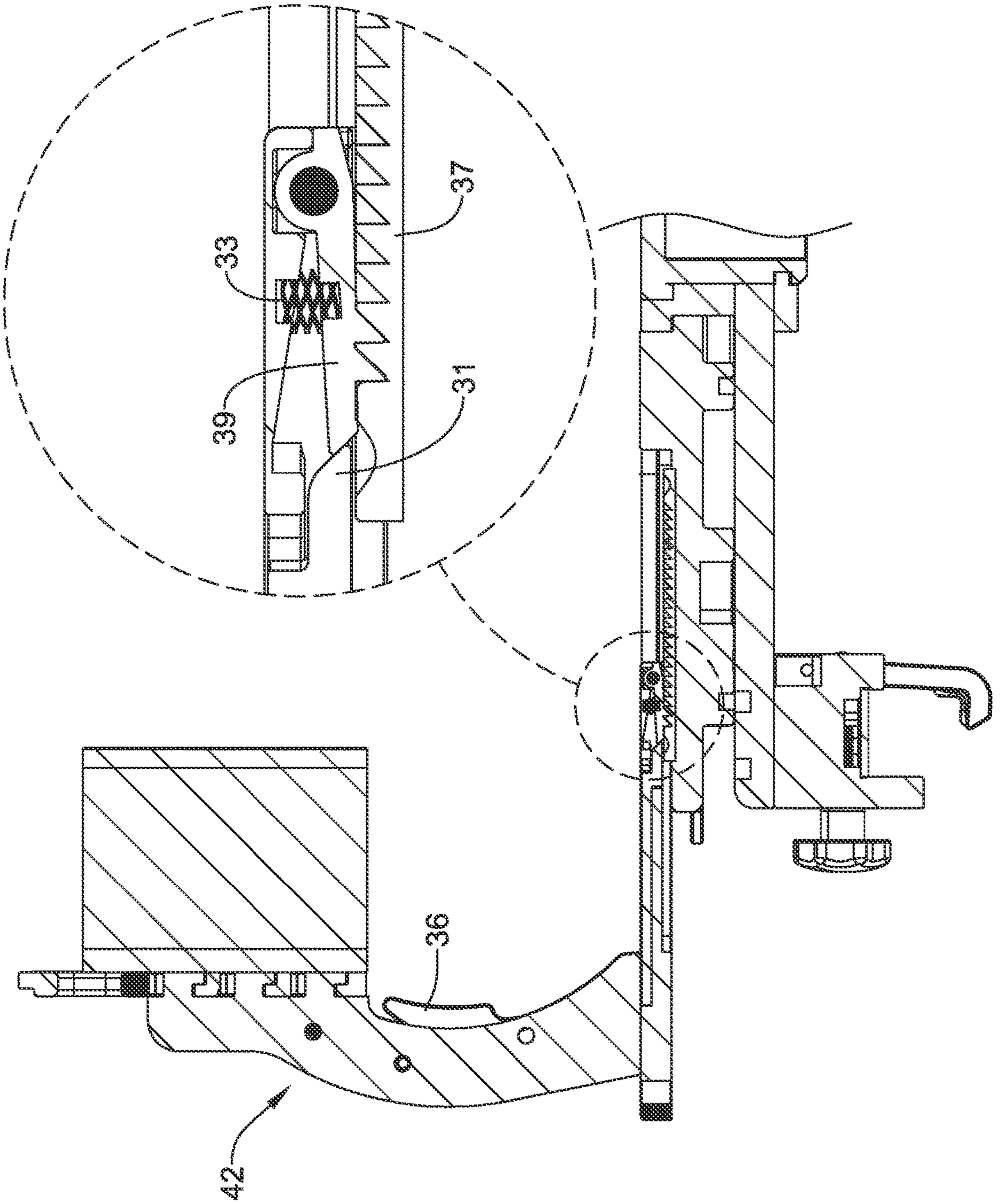
FIG. 6 is a partial cross-sectional view of an example bolster.

An adjustment mechanism may be disposed along the base 44. In some instances, the adjustment mechanism may be described as a ratchet or a ratcheting adjustment mechanism. The adjustment mechanism may include an actuator 36. For example, the actuator 36 may be a trigger actuator. As shown in FIG. 6, a pawl 39 (e.g., having teeth corresponding to the toothed section 37) may be configured to engage the rack 37. A spring or biasing member 33 may be coupled to the pawl 39. In at least some instances, the spring 33 may be configured to urge the pawl 39 into engagement with the rack 37. The actuator 36 may be coupled to a shifting member 31 configured to engage the pawl 39. Actuation of the actuator may cause the shifting member 31 to engage the pawl 39, thereby causing the pawl 39 to shift out of engagement with the rack 37. In such a configuration, the bolster 42 can be shifted in position along the rack 37. Releasing the actuator 36 allows the spring 33 to shift the pawl 39 back into engagement with the rack 37 and secure the position of the bolster 42.

Figure 7:
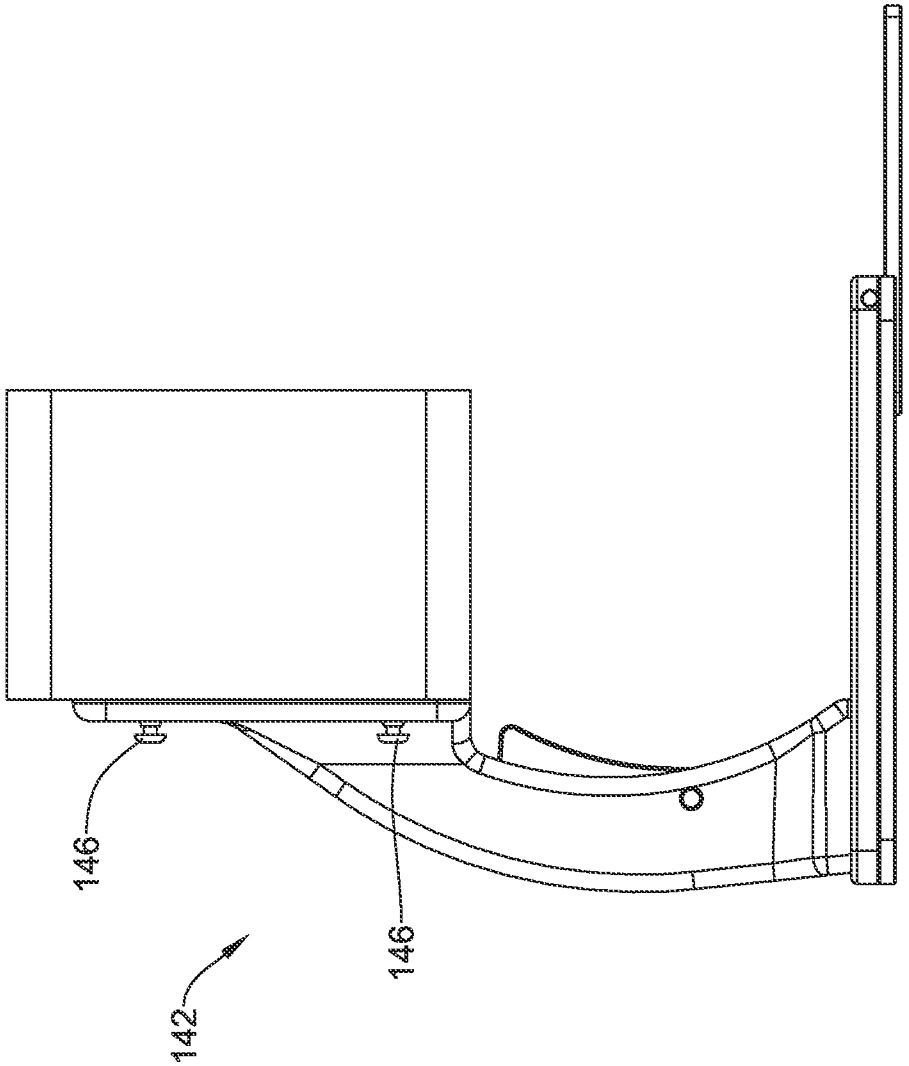
FIG. 7 is a side view of an example bolster.

As shown in FIG. 6, the strap holding region(s) 46 may take the form of a ring or loop-like structure configured to accommodate a strap therethrough. This may allow a strap to be passed or threaded therethrough. This may include a strap with a cam buckle disposed thereon. In some of these and in other instances, the strap may have a quick-connect structural feature such a hook that can engage the strap holding region(s) 46. It can be appreciated that differing strap holding regions are contemplated. For example, FIG. 7 illustrates another example bolster 142 that may be similar in form and function to other bolsters disclosed herein. The bolster 142 may include one or more strap holding regions 146. In this example, the strap holding region 146 may take the form of a button-like or flanged projection configured to engage a strap (e.g., by passing through an opening in a strap).

Figure 9:
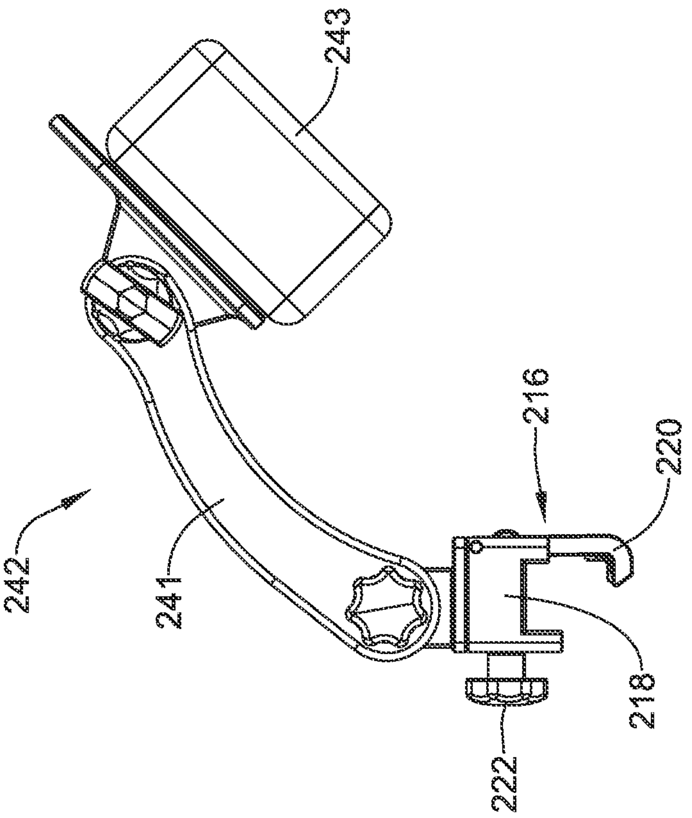
FIG. 9 is a side view of an example bolster.
Figure 8:
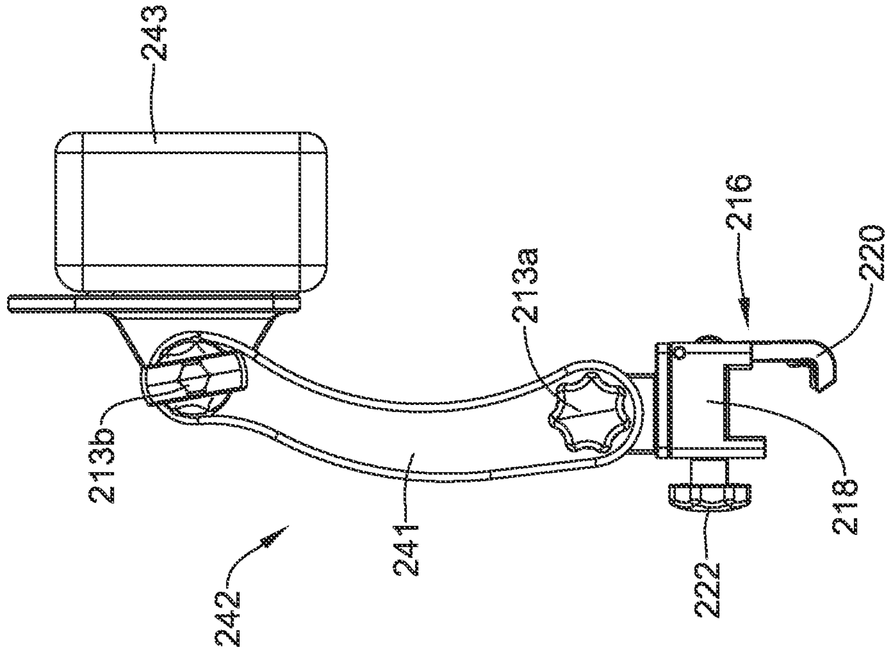
FIG. 8 is a side view of an example bolster.

FIGS. 8-9 illustrate another example bolster 242 that may be similar in form and function to other bolsters disclosed herein. The bolster 242 may be understood to be a contralateral bolster. The bolster 242 may include an arm region 241 and a patient support region 243 coupled to and/or otherwise extending from the arm region 241. One or more hinges or adjustment members (e.g., two adjustment members 213*a*, 213*b*) may be disposed along the arm region 241. The adjustment members 213*a*, 213*b* may be used to adjust the position of the bolster 242 (e.g., FIG. 8 illustrates the bolster 242 in a first position and FIG. 9 illustrates the bolster 242 in an adjusted position).

The bolster 242 may also include an attachment member 216, for example for securing the bolster 242 to a rail of a medical/hospital bed. The attachment members 216 may include a clamp body 218 and a clamp arm or member 220 coupled to the clamp body 218. In general, the clamp body 218 may be configured to fit onto a bed rail and the clamp arm 220 may be pivotably coupled to the clamp body 218 to help secure the clamp body 218 to the bed rail. An actuator or knob 222 may be configured to shift/pivot the clamp arm 220 relative to the clamp body 218 so as to secure the attachment member 216 to/around the rail.

Figure 11:
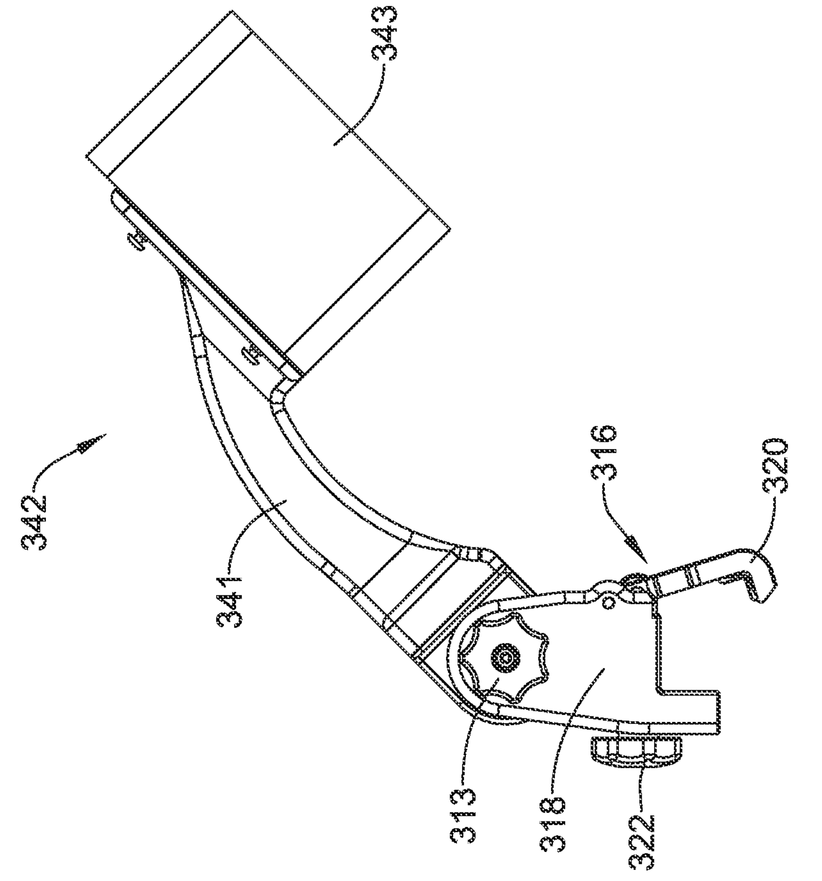
FIG. 11 is a side view of an example bolster.
Figure 10:
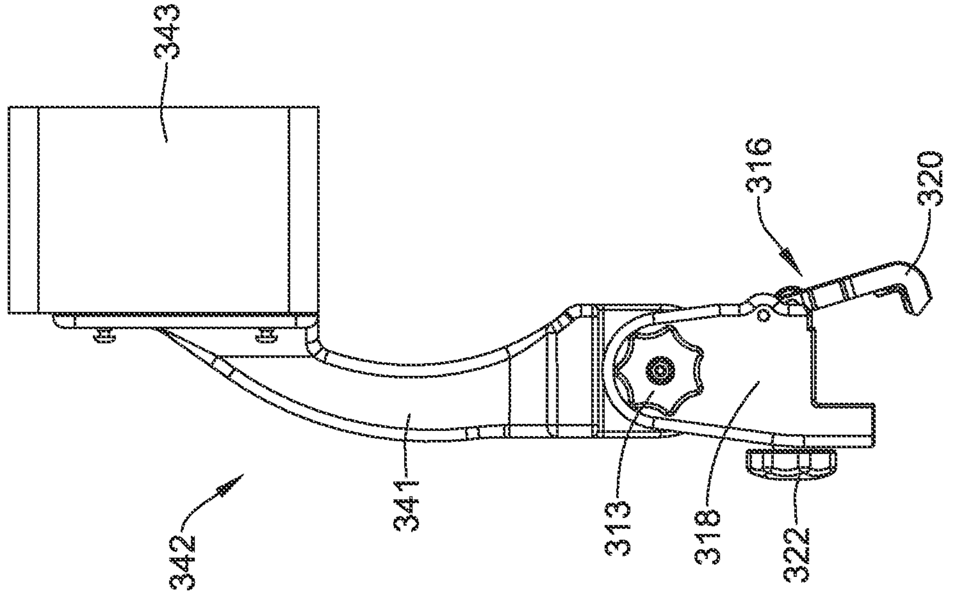
FIG. 10 is a side view of an example bolster.
Figure 12:
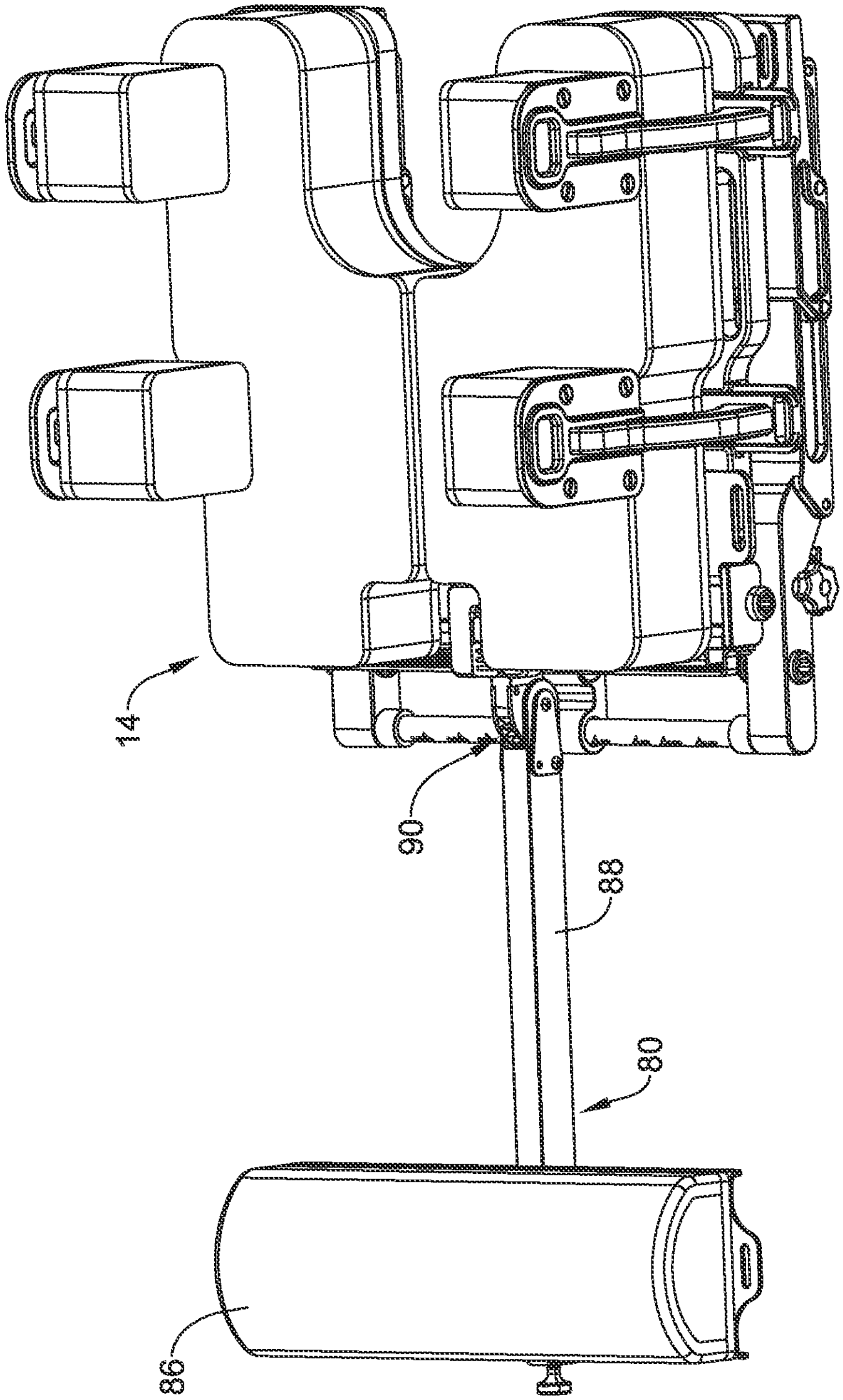
FIG. 12 is a perspective view of a portion of an example patient positioner.

FIGS. 10-11 illustrate another example bolster 342 that may be similar in form and function to other bolsters disclosed herein. The bolster 342 may be understood to be a contralateral bolster. The bolster 342 may include an arm region 341 and a patient support region 343 coupled to and/or otherwise extending from the arm region 341. One or more hinges or adjustment members (e.g., an adjustment member 313) may be disposed along the arm region 341. The adjustment member 313 may be used to adjust the position of the bolster 342 (e.g., FIG. 10 illustrates the bolster 342 in a first position and FIG. 11 illustrates the bolster 342 in an adjusted position).

The bolster 342 may also include an attachment member 316, for example for securing the bolster 342 to a rail of a medical/hospital bed. The attachment members 316 may include a clamp body 318 and a clamp arm or member 320 coupled to the clamp body 318. In general, the clamp body 318 may be configured to fit onto a bed rail and the clamp arm 320 may be pivotably coupled to the clamp body 318 to help secure the clamp body 318 to the bed rail. An actuator or knob 322 may be configured to shift/pivot the clamp arm 320 relative to the clamp body 318 so as to secure the attachment member 316 to/around the rail.

FIGS. 12-15 illustrate the lumbar support assembly 14. In some instances, a leg adjustment assembly 80 may be coupled to the lumbar support assembly 14. The leg adjustment assembly 80 may be considered to be a component of the lumbar support assembly 14. Alternatively, the leg adjustment assembly 80 may be considered to be a distinct component, separate from the lumbar support assembly 14. The leg adjustment assembly 80 may include a leg support 86, an arm 88, and an attachment region 90 for attaching the leg adjustment assembly 80 to the lumbar support assembly 14.

Figure 13:
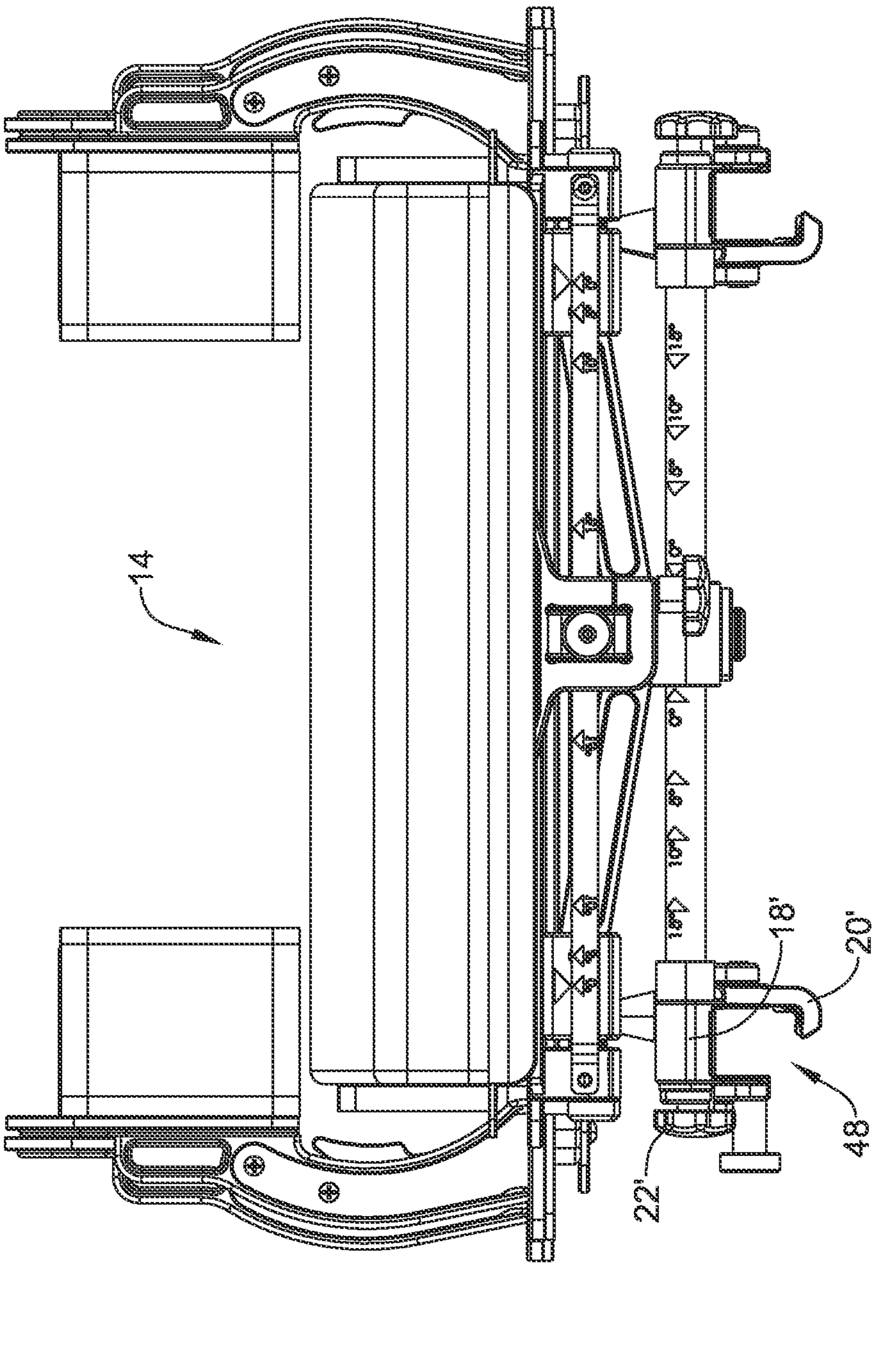
FIG. 13 is an end view of a portion of an example patient positioner.
Figure 14:
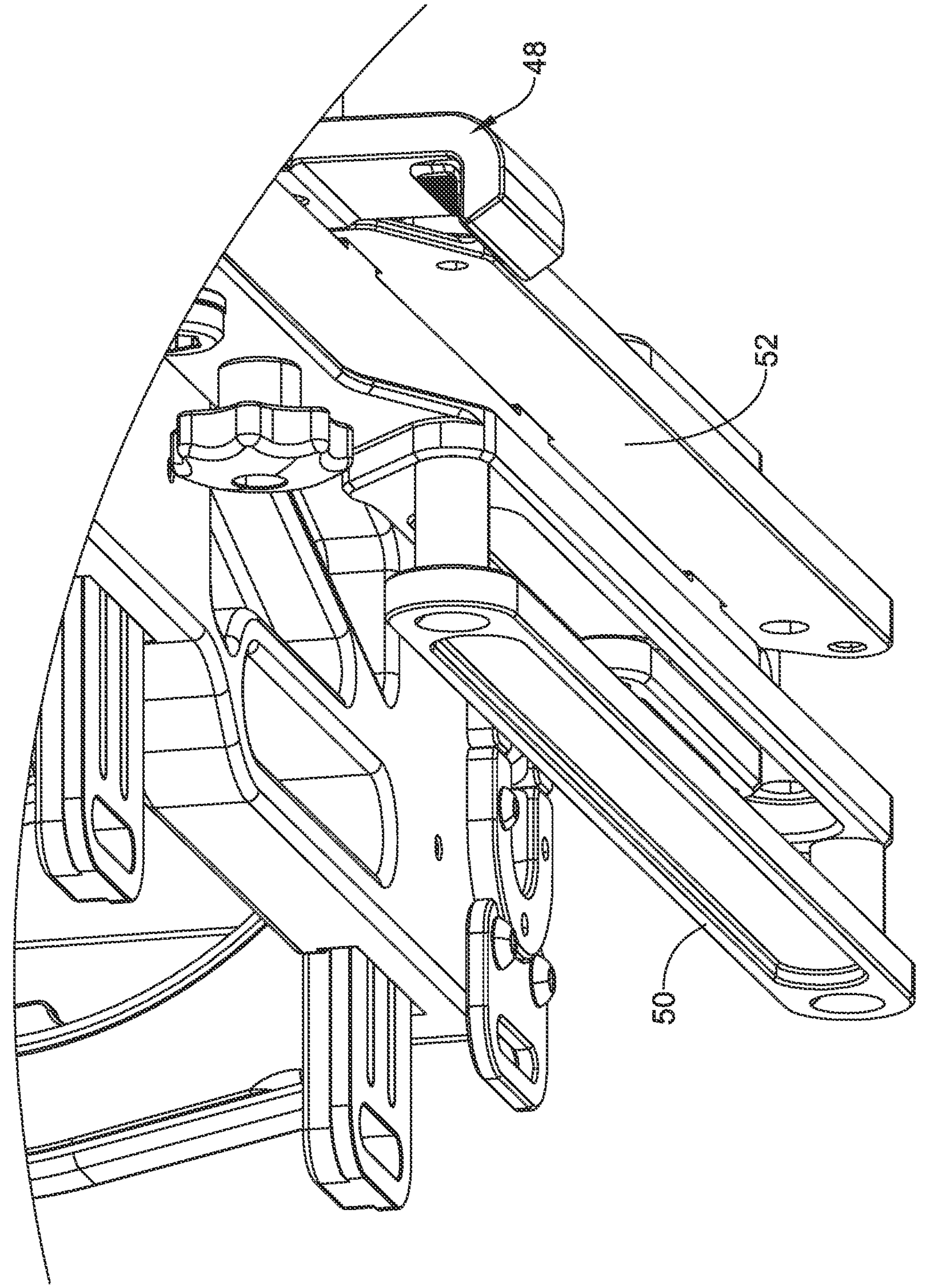
FIG. 14 is a perspective view of a portion of an example patient positioner.

Turning to FIG. 13, here it can be seen that the lumbar support assembly 14 may include an attachment mechanism 48, for example for securing the lumbar support assembly 14 to a rail of a medical/hospital bed. In general, the attachment mechanism 48 may be similar in form and function to the attachment mechanism 16 (e.g., a part/component of the thoracic support assembly 12). For example, the attachment mechanism 48 may include a clamp body 18' and a clamp arm or member 20' coupled to the clamp body 18'. An actuator or knob 22' may be configured to shift/pivot the clamp arm 20' relative to the clamp body 18'. Other structures and/or description pertaining to the attachment mechanism 16 may be applied to the attachment mechanism 48, as appropriate.

Figure 15:
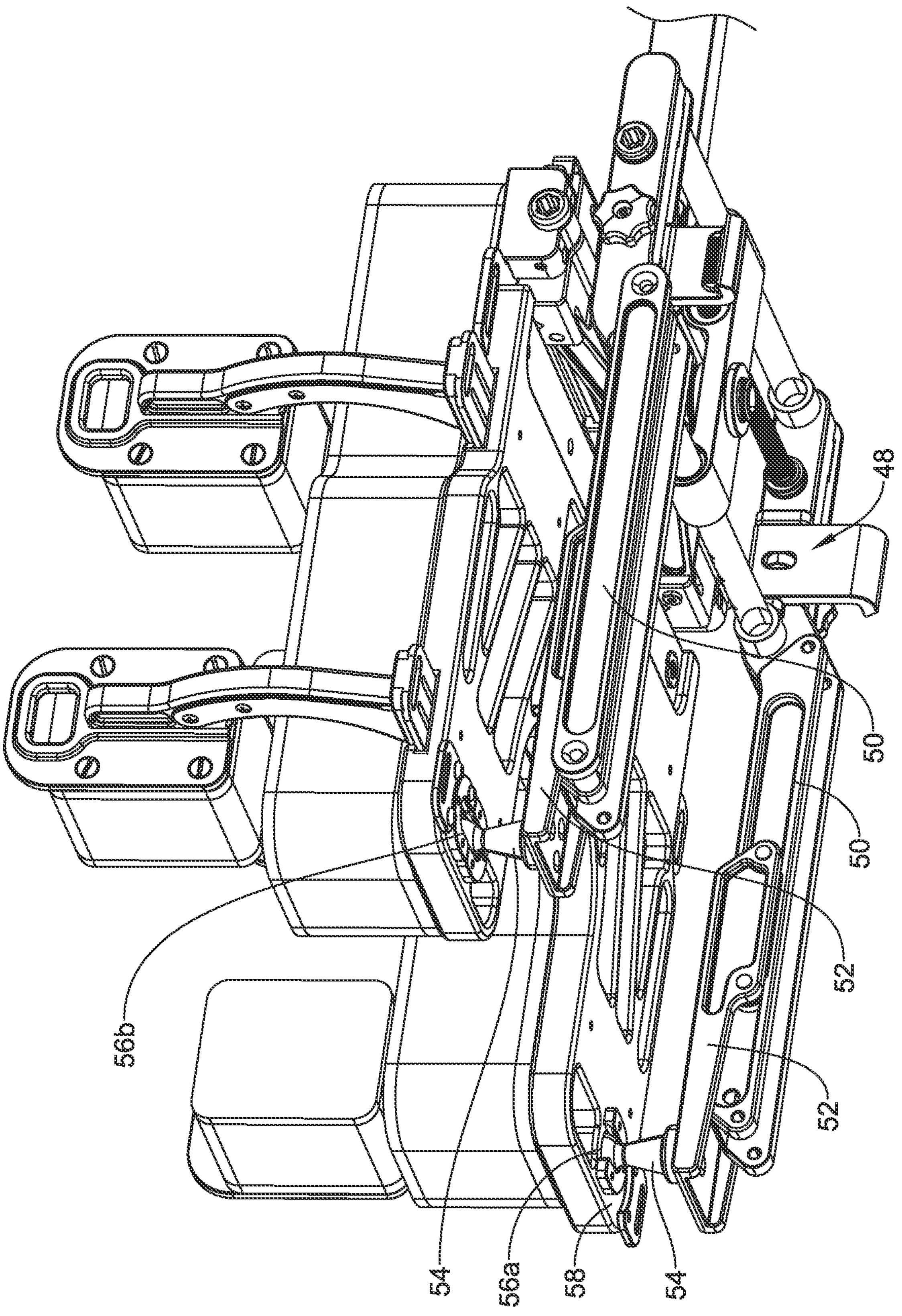
FIG. 15 is a perspective view of a portion of an example patient positioner.
Figure 16:
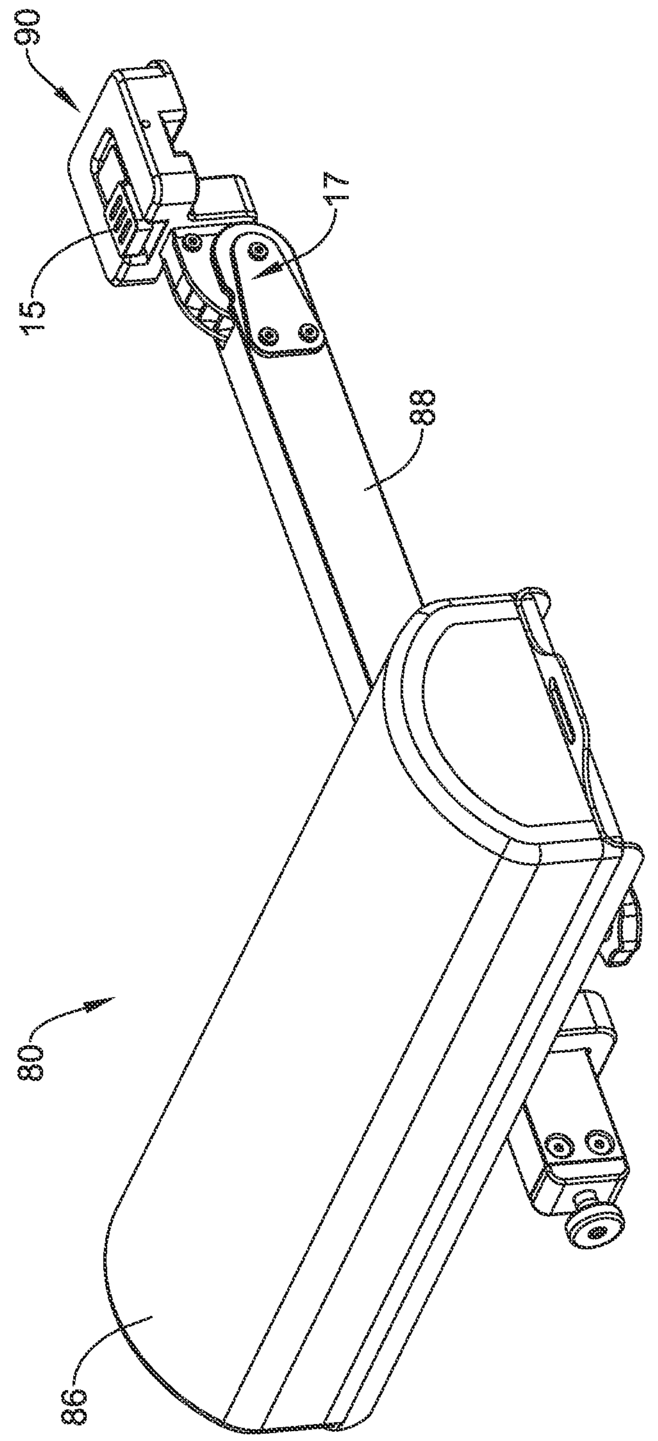
FIG. 16 is a perspective view of a portion of an example patient positioner.

As shown in FIG. 15, the lumbar support assembly 14 may include one or more rail members 50. In this example, the lumbar support assembly 14 includes a pair of rail members 50. A sliding member 52 may be coupled to each of the rail members 50. Each sliding member 52 is slidably coupled to the rail members 50 such that a sliding mechanism (e.g., rollers/pins, etc.) of the sliding members 52 engage and slide within recesses on the rail members 50. This may allow the lumbar support assembly 14 to be shifted in position in order to accommodate a patient for a given intervention. The rail members 50 may also be used to attach other tools or accessories for use with a patient positioner 10.

The lumbar support assembly 14 may include one or more ball joint members 54 that extend from each of the sliding members 52 as shown in FIG. 15. In some instances, each of the ball joint members 54 are received within a slot or socket 56*a*, 56*b* formed in a lumbar support plate 58 (e.g., which may form a base or platform for the lumbar support assembly 14). The ball joint members 54 may take the form of a rod or shaft having a ball-shaped structure, or the like, on the end thereof. The balls of the ball joint members 54 may be fitted with and/or otherwise engaged with the sockets 56*a*, 56*b*. In some instances, the ball joint members 54 are non-releasably secured to the sockets 56*a*, 56*b*. Alternatively, one or more of the ball joint members 54 are releasably/removably secured to the sockets 56*a*, 56*b*. In other words, one or more of the ball joint members 54 may be removable/detachable from the sockets 56*a*, 56*b*. The ball joint members 54 and sockets 56*a*, 56*b* allow for the lumbar support plate 58 to pivot and/or rotate relative to the attachment mechanisms 48. In some instances, one of the sockets 56*a*, 56*b* is larger and/or longer than at least some of the other sockets. For example, the socket 56*b* may be larger and/or longer than socket 56*a*. This may allow for some translation of the lumbar support plate 58 relative to the attachment mechanisms 48.

Figure 17:
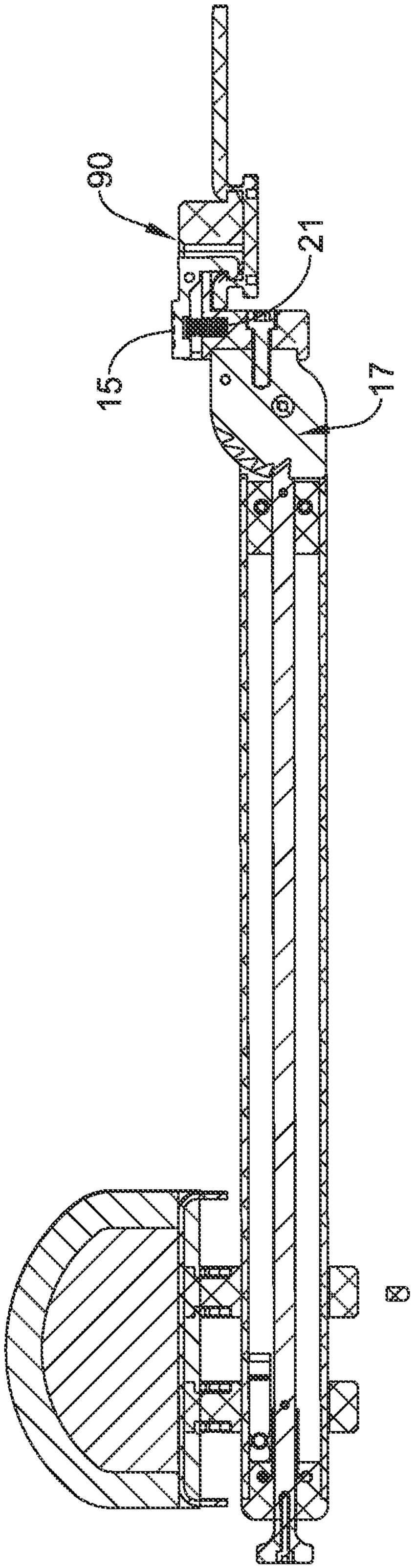
FIG. 17 is a partial cross-sectional view of a portion of an example patient positioner.
Figure 18:
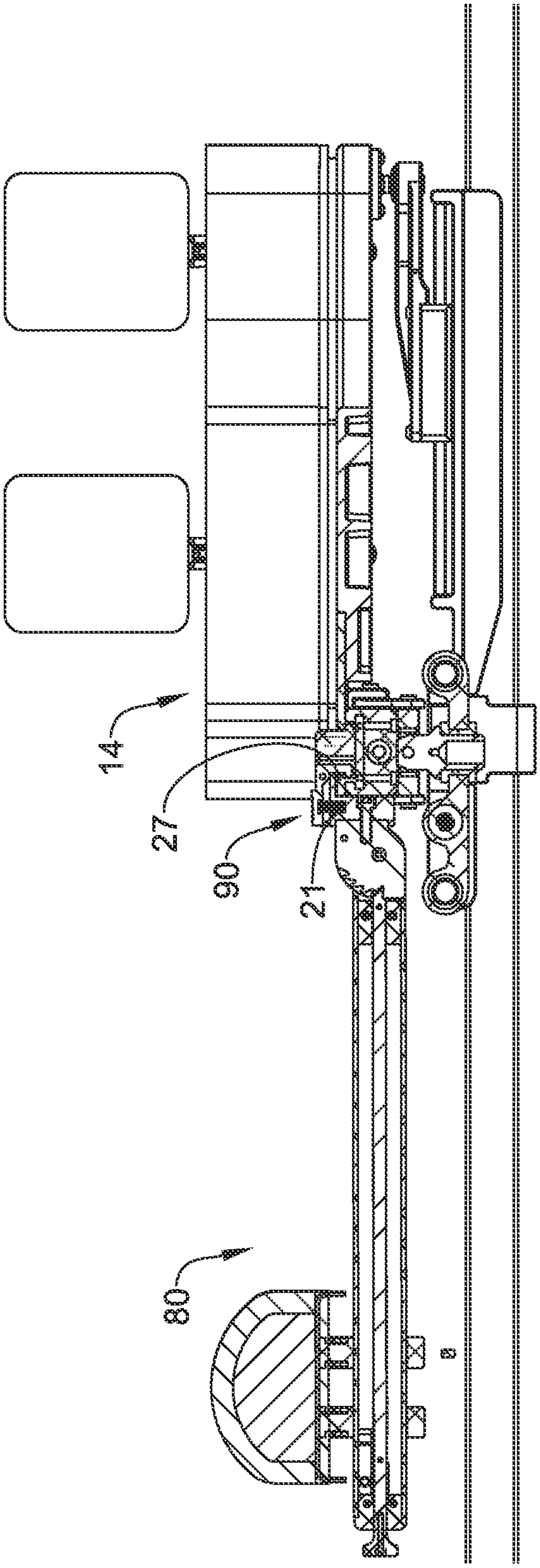
FIG. 18 is a partial cross-sectional view of a portion of an example patient positioner.
Figure 19:
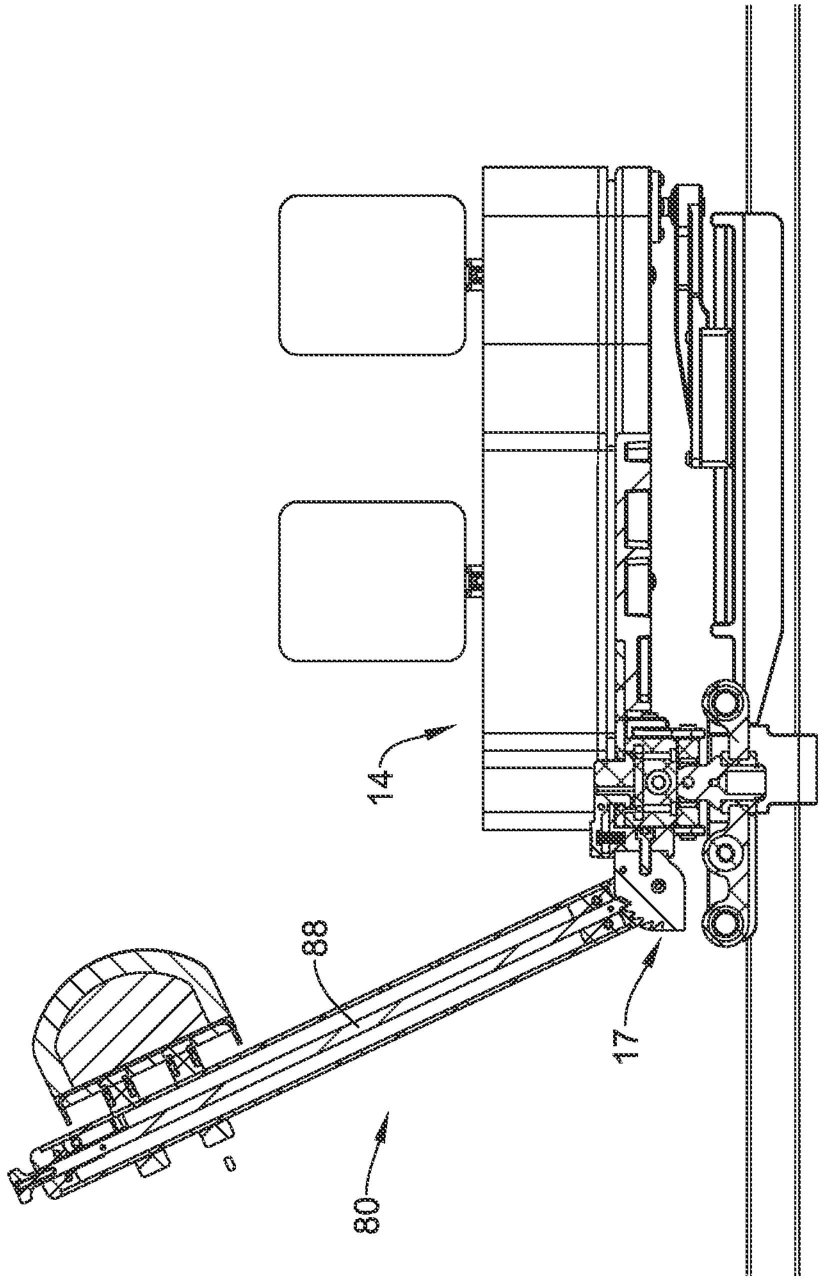
FIG. 19 is a partial cross-sectional view of a portion of an example patient positioner.

FIGS. 16-20 illustrate the leg adjustment assembly 80. Here it can be seen that the attachment region 90 may include a push-button actuator 15 configured to be used to help secure the leg adjustment assembly 80 to the lumbar support assembly 14 via the attachment region 90. For example, the push-button actuator 15 may actuate a latch or securing mechanism 27 that can be secured to the lumbar support assembly 14. In some instances, a biasing member 21 (e.g., a spring as shown in FIGS. 17-18) may be coupled to the push-button actuator 15. This may bias the latch 27 toward an unlocked position/arrangement. Depressing the push-button actuator 15 may "open" the latch 27 so that the latch can be engaged with the lumbar support assembly 14. Releasing the push-button actuator 15 may allow the biasing member 21 to shift the latch back to a locked position arrangement. It can be appreciated that other securing mechanisms are contemplated including ratchets, threadable connections, mechanical interlocking connections, combinations thereof, and/or the like.

Figure 20:
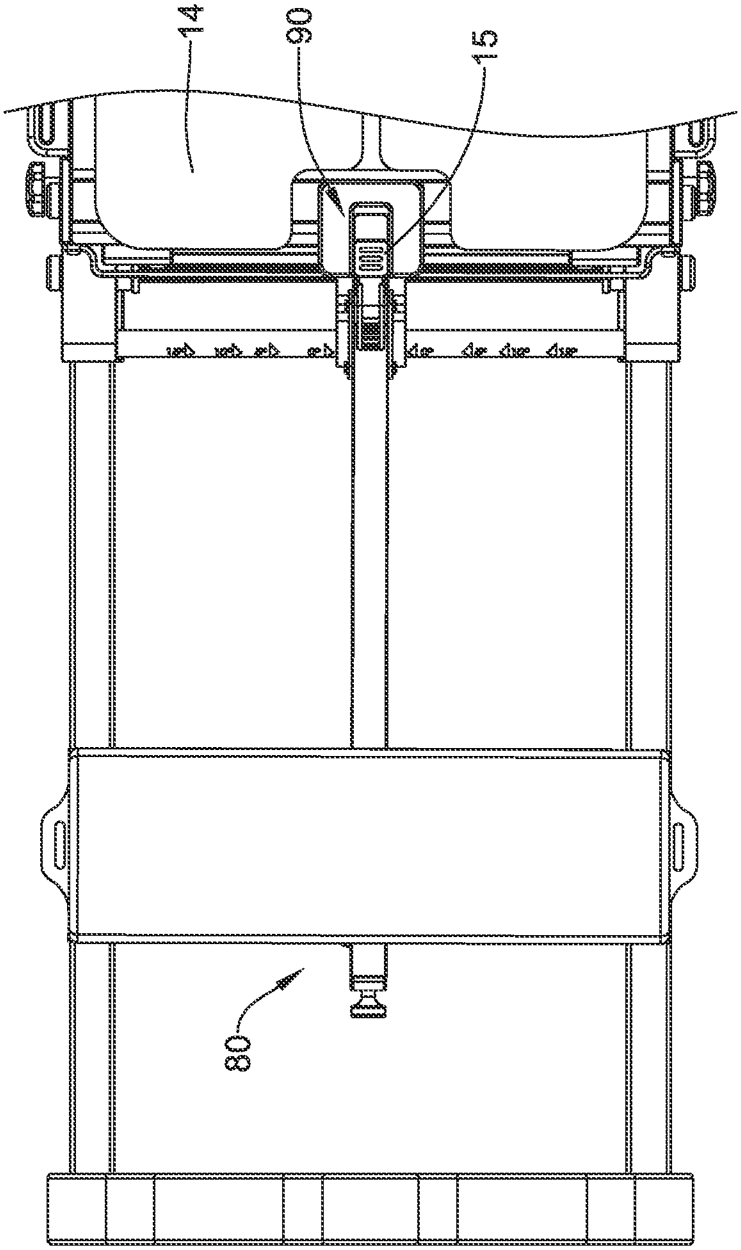
FIG. 20 is a top view of a portion of an example patient positioner.

The arm 88 may be coupled to the attachment region 90 with a hinged connector 17. The hinged connector 17 may allow the arm 88 to shift/pivot relative to the attachment region 90. For example, the arm 88 may be pivoted between a first position (e.g., such as that shown in FIGS. 18-19 and a second position (e.g., such as what is shown in FIG. 20).

Figure 21:
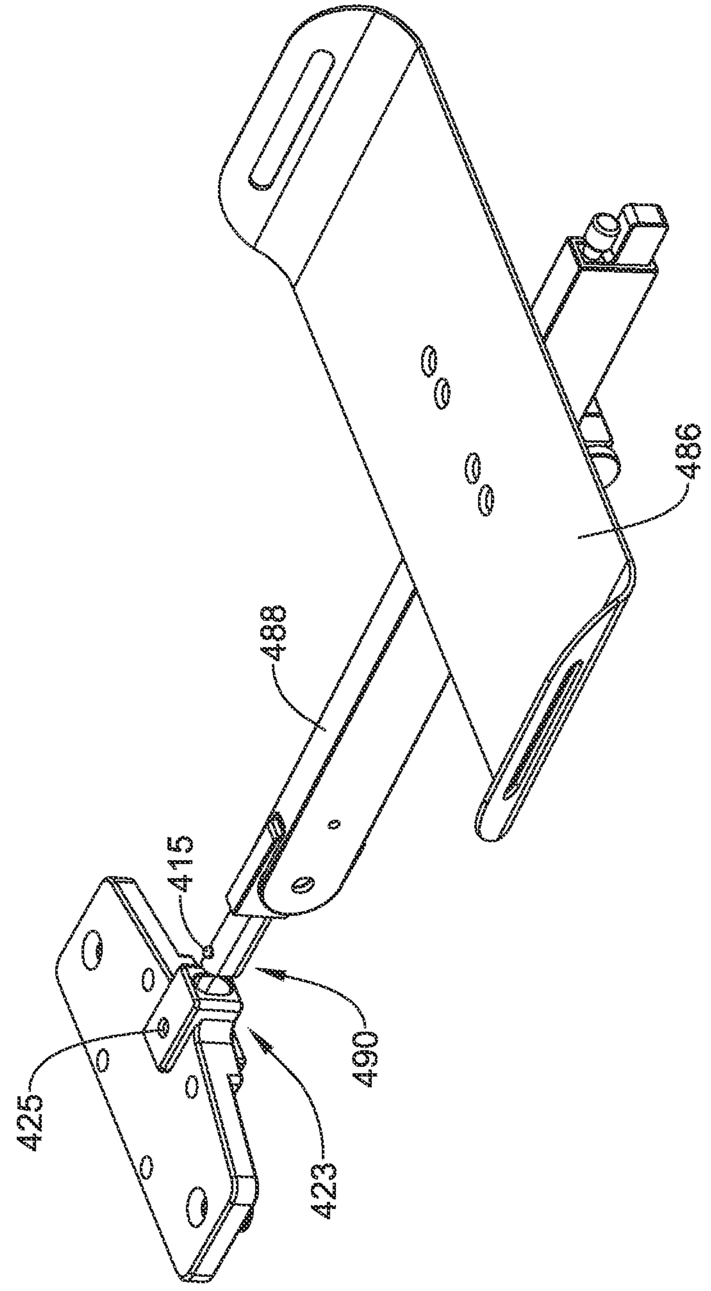
FIG. 21 is a perspective view of a portion of an example patient positioner.
Figure 22:
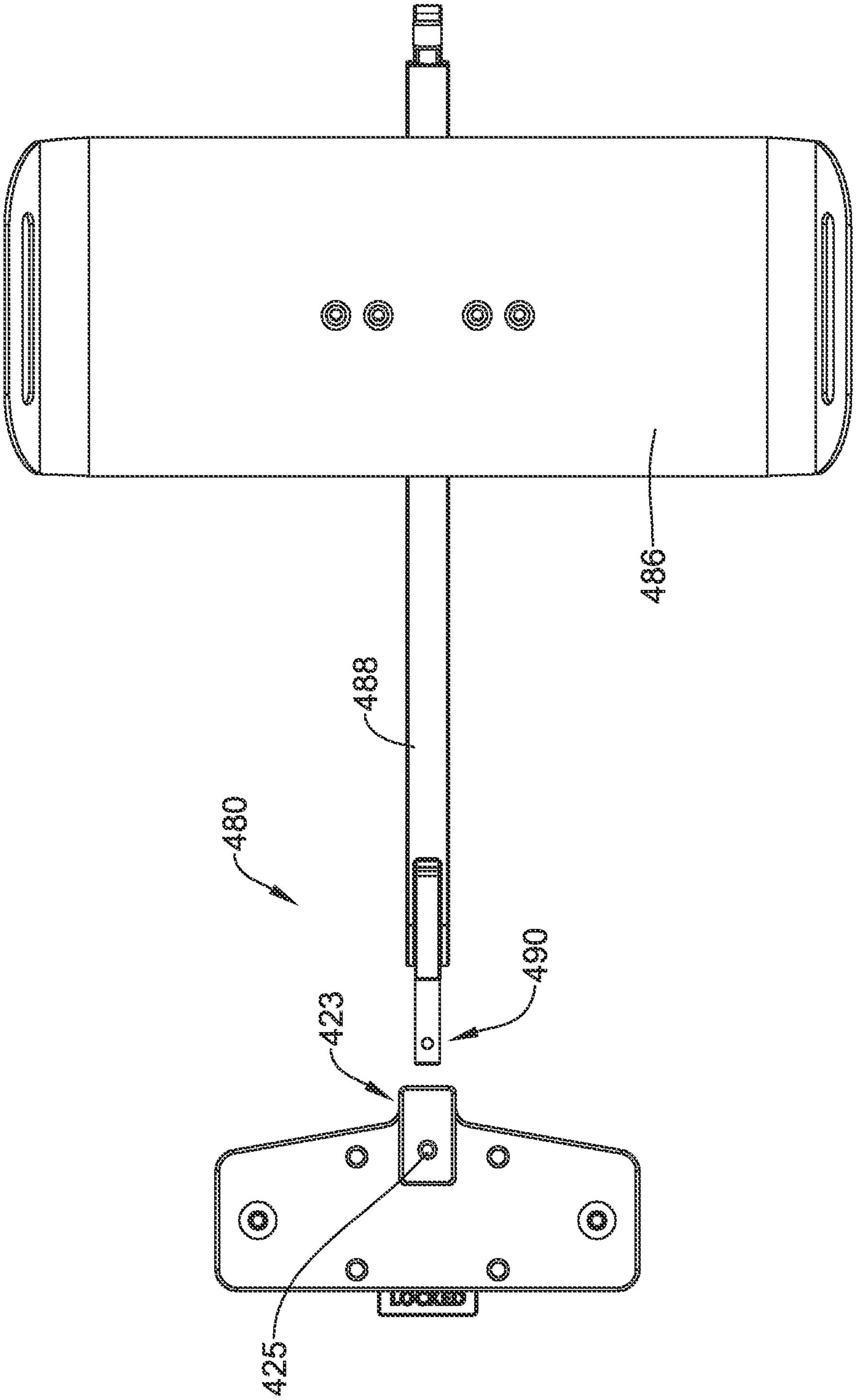
FIG. 22 is a top view of a portion of an example patient positioner.
Figure 23:
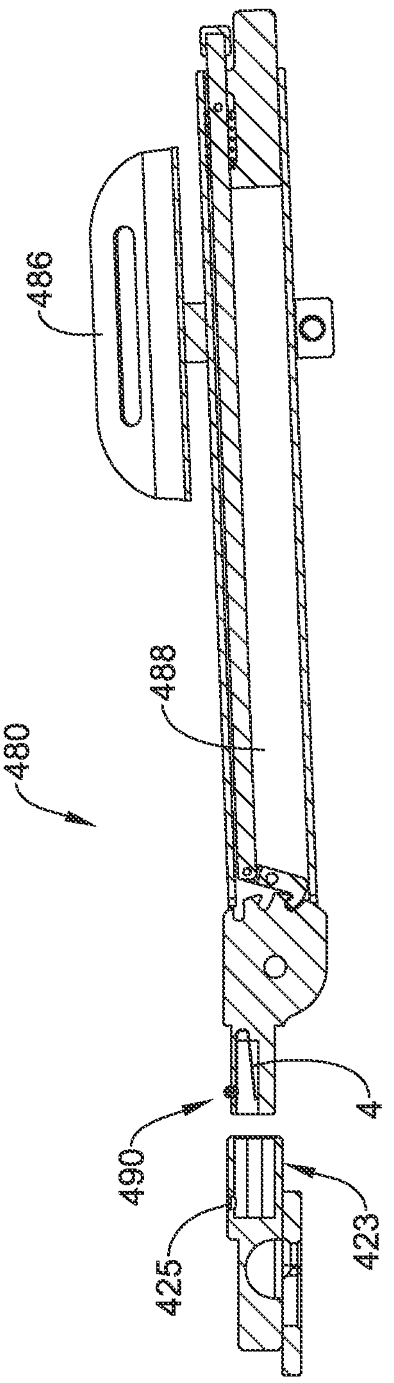
FIG. 23 partial cross-sectional view of a portion of an example patient positioner.

FIGS. 21-23 illustrate another example leg adjustment assembly 480 similar in form and function to other leg adjustment assemblies disclosed herein. The leg adjustment assembly 480 may include a leg support 486, an arm 488, and an attachment region 490. An actuator 415 may be disposed along the attachment region 490. In some instances, the actuator may take the form of a leaf spring. The actuator 415 may be configured to secure the attachment region 490 to a receptacle 423. For example, the actuator 415 may extend into and/or through an opening 425.

Figure 24:
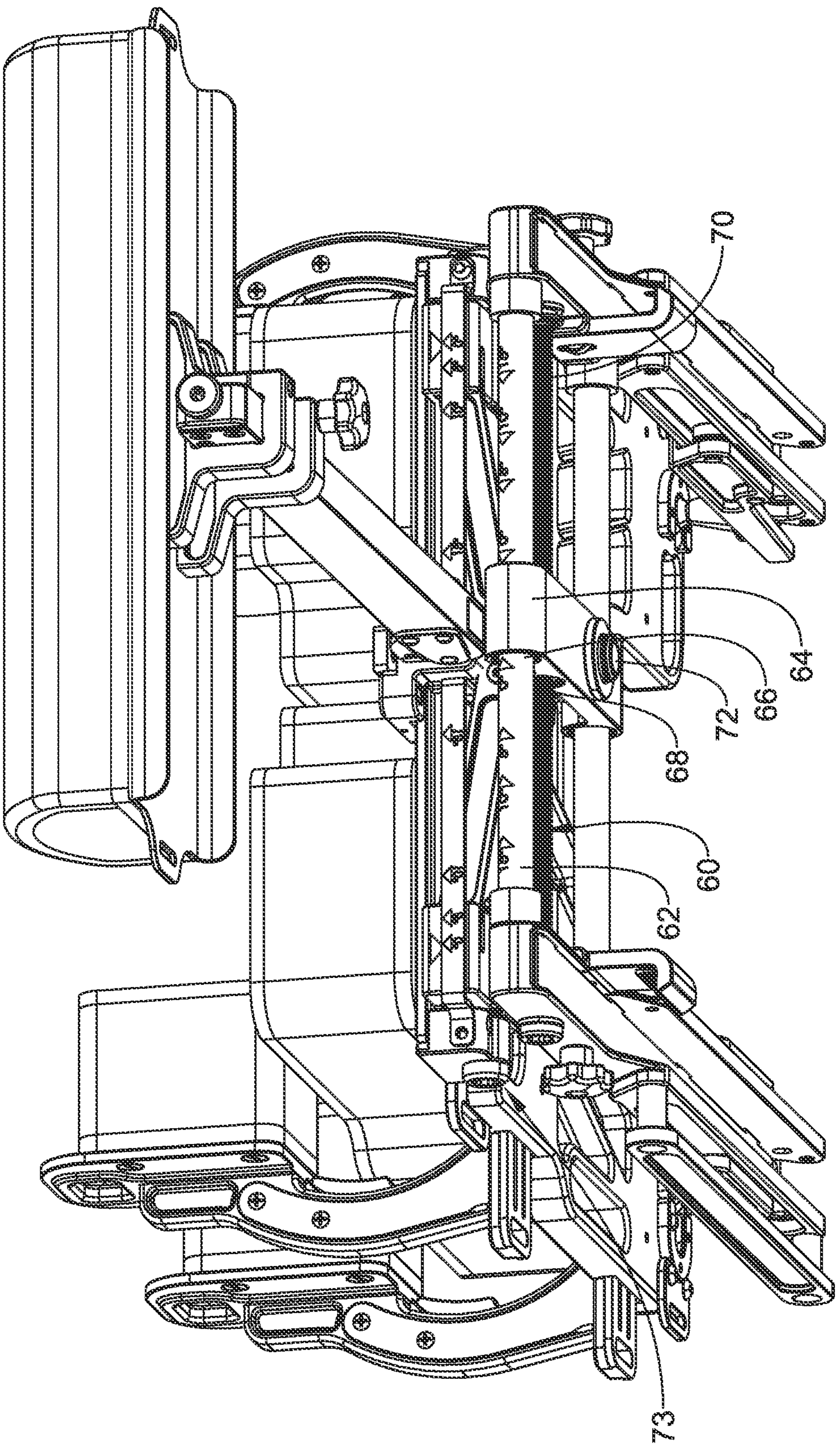
FIG. 24 is a perspective view of a portion of an example patient positioner.
Figure 25:
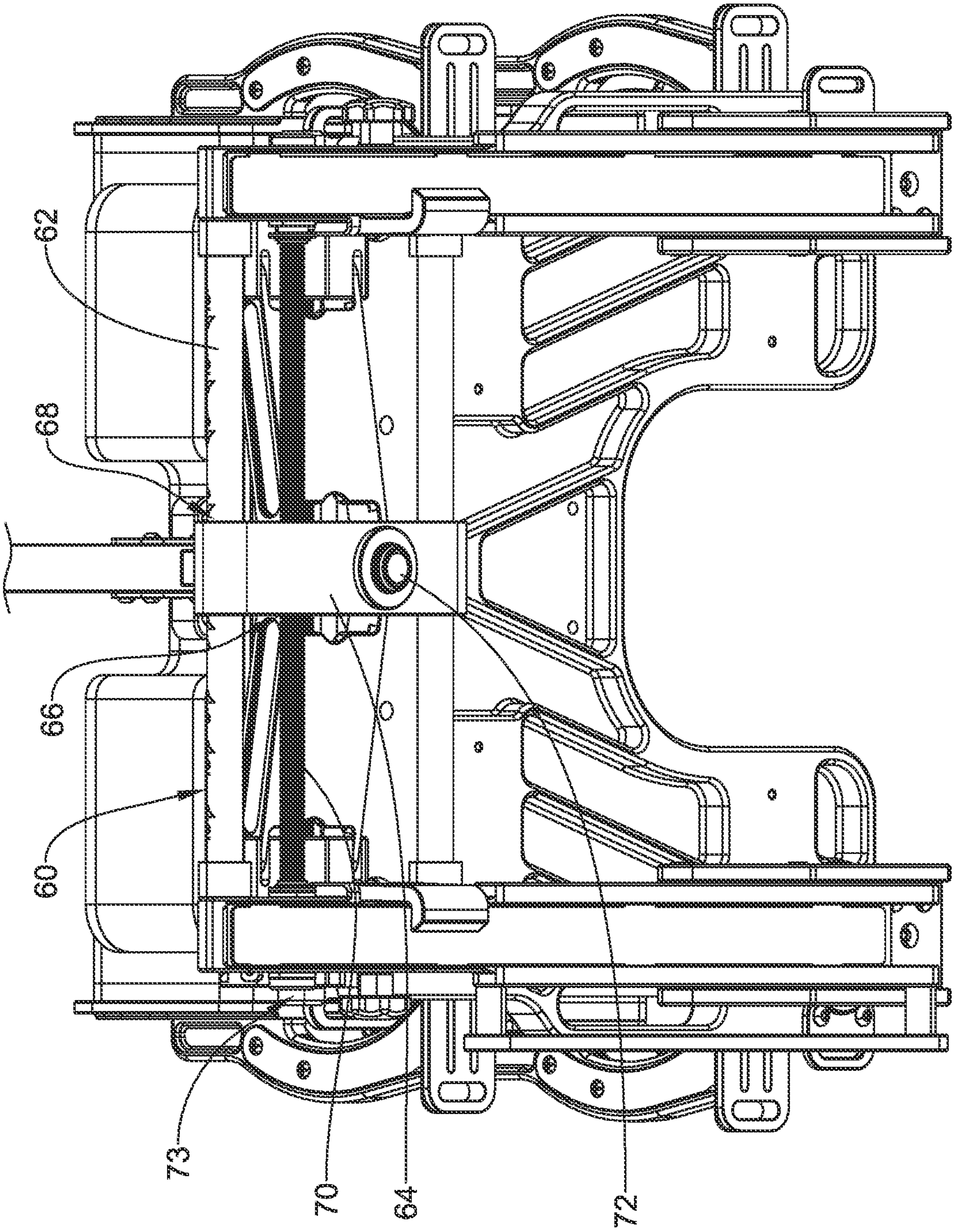
FIG. 25 is a bottom view of a portion of an example patient positioner.

The lumbar support assembly 14 may also include a lateral rotation assembly 60 as depicted in FIGS. 24-25. In some instances, the lateral rotation assembly 60 may be similar in form and function to the thoracic adjustment mechanism 24. Thus, the lateral rotation assembly 60 may include structures similar to those of the thoracic adjustment mechanism. In general, the lateral rotation assembly 60 may be configured to rotate the patient to the left or right (e.g., rather than front/back) and/or to extend/elongate one side or the other. When doing so, the lumbar support assembly 14 may rotate, pivot, and/or otherwise shift by movement at/about the ball joint members 54. The lateral rotation assembly 60 may include one or more support rails 62 extending between the attachment mechanisms 48. In some instances, the rails 62 may include visible angle indicator markings, which may help to inform a clinician with the extent of rotation. The lateral rotation assembly 60 may include a lateral carriage 64 having a threaded opening 66 and a non-threaded opening 68. A threaded rod 70 may engage the threaded opening 66 to translate the lateral carriage 64 along the rails 62. A central post 72 may extend upward into the lordosis assembly 74.

Figure 26:
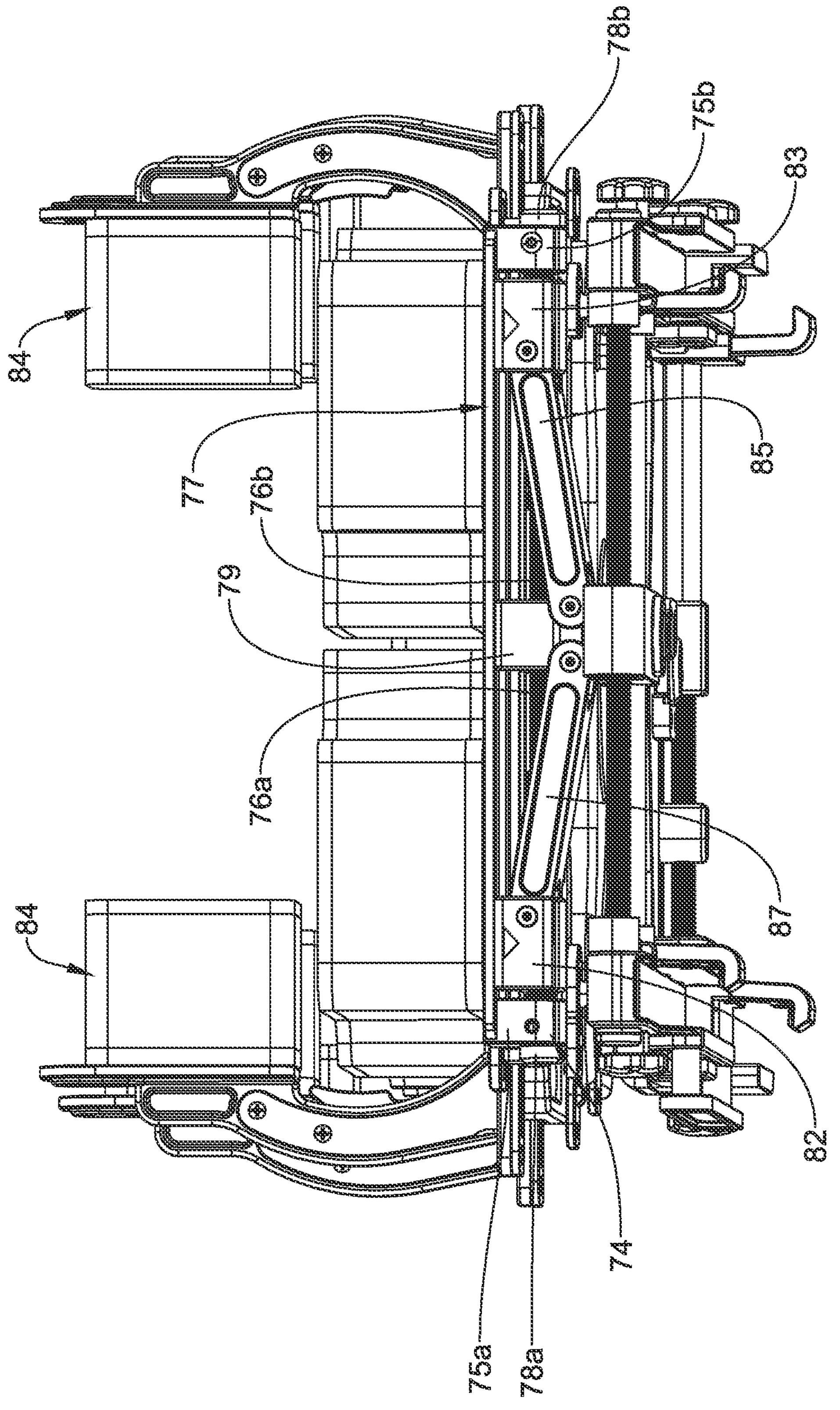
FIG. 26 is a perspective view of a portion of an example patient positioner.

One or more actuators 73 may be coupled to the rod 70. In some instances, actuators 73 are disposed on opposite ends of the rod 70. In at least some instances, the actuator(s) 73 may take the form of a nut or nut head that can be engaged by a tool (not shown) in order to cause rotation of the actuator 73. For example, a tool may be engaged with the actuator 73 and rotated in order to cause the rod 70 to rotate. By doing so, the carriage 64 may translate along the rod 70, thereby causing the lumbar support assembly 14 to rotate (e.g., rotation may include rotation of a support housing 77, which are labeled in FIG. 26). In some instances, a crank or crank-like mechanism (e.g., which may be integral or integrated with the actuator 73 in some instances) may be disposed on or adjacent the actuator 73 and that may be used to rotate the rod 70.

The lumbar support assembly 14 may include a lordosis assembly 74 as shown in FIGS. 26-32. In general, the lordosis assembly 74 may be used to raise and/or tilt the lumbar support assembly 14. The lordosis assembly 74 may be used in conjunction with the ball joint members 54 and socket 56*a*, 56*b* so that raising and/or tilting the lumbar support assembly 14 includes raising/tilting the lumbar support assembly 14 via the ball joint members 54 (e.g., the ball joint members 54 allow for raising/tilting the lumbar support assembly 14).

The lordosis assembly 74 may include opposing end supports 75*a*, 75*b* coupled to a lumbar support housing 77. A pair of threaded lordosis rods 76*a*, 76*b* may be coupled to the end supports 75*a*, 75*b*. The first threaded lordosis rod 76*a* may extend from a first one of the end supports 75*a* to the support housing 77. The second threaded lordosis rod 76*b* may extend from a second one of the end supports 75*b* to the support housing 77. The rods 76*a*, 76*b* may be aligned with one another and, generally, can be actuated independently (e.g., at adjustment inputs 78*a*, 78*b*).

A coupling sleeve 79 may couple the inner ends of the rods 76*a*, 76*b* to the support housing 77. The coupling sleeve 79 may couple the inner ends of the rods 76*a*, 76*b* to the support housing 77. The support housing 77 may be slidable along the lumbar support plate 58 (e.g., please see FIG. 15). In some instances, the support housing 77 may also be coupled to the leg adjustment assembly 80. The support housing 77 may include an opening that can receive the central post 72 of the lateral rotation assembly 60.

Figure 27:
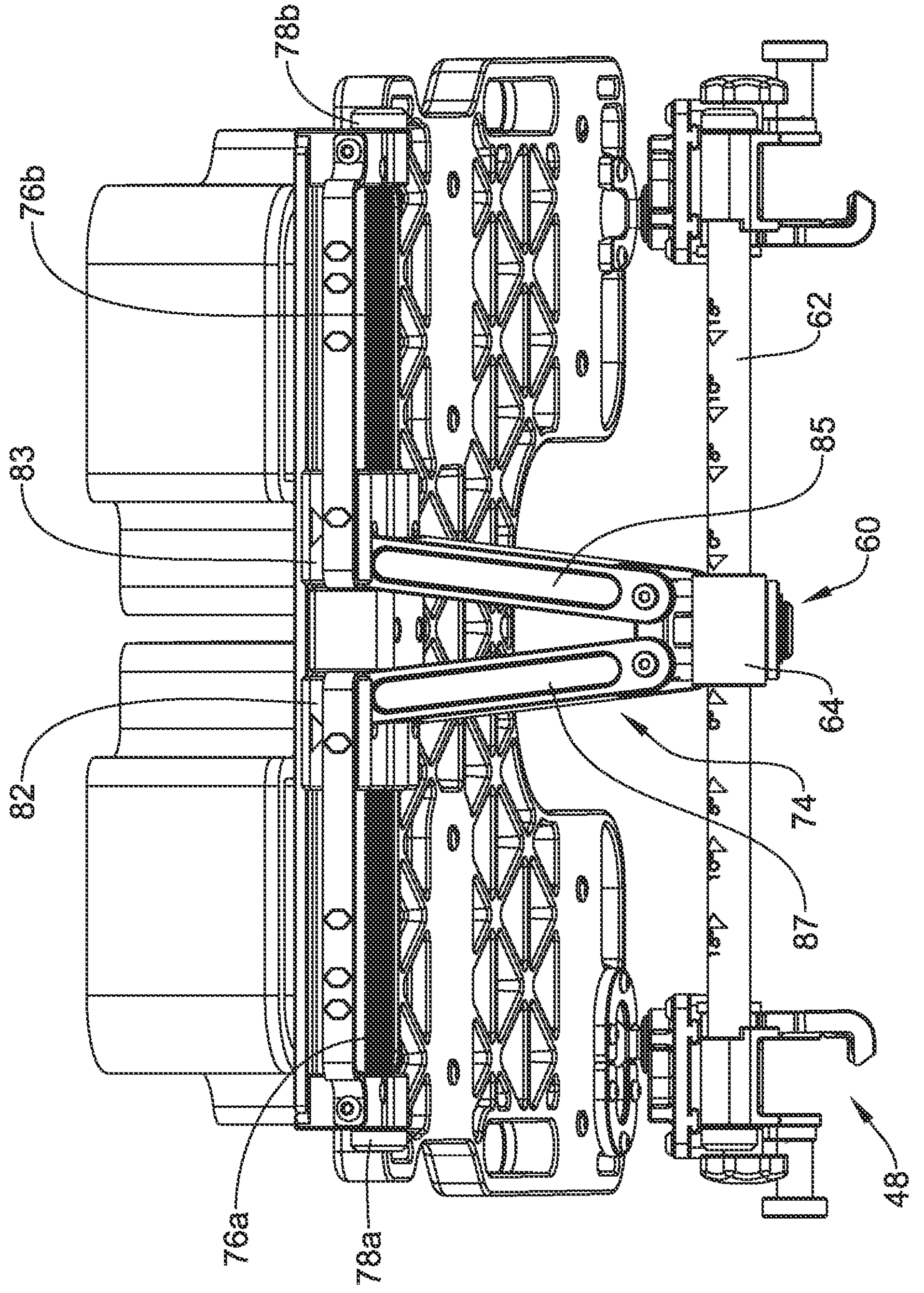
FIG. 27 is a perspective view of a portion of an example patient positioner.
Figure 28:
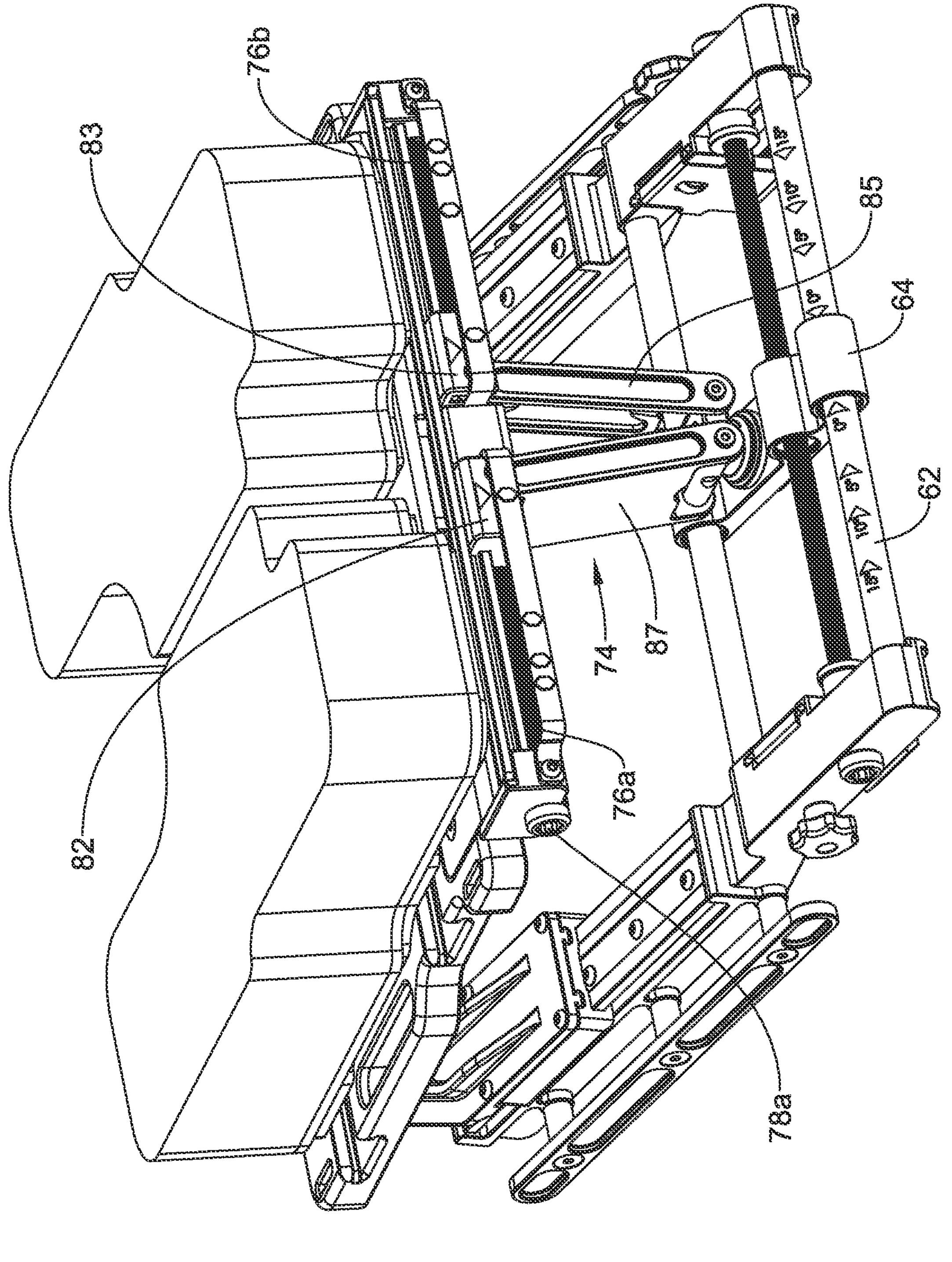
FIG. 28 is a perspective view of a portion of an example patient positioner.
Figure 29:
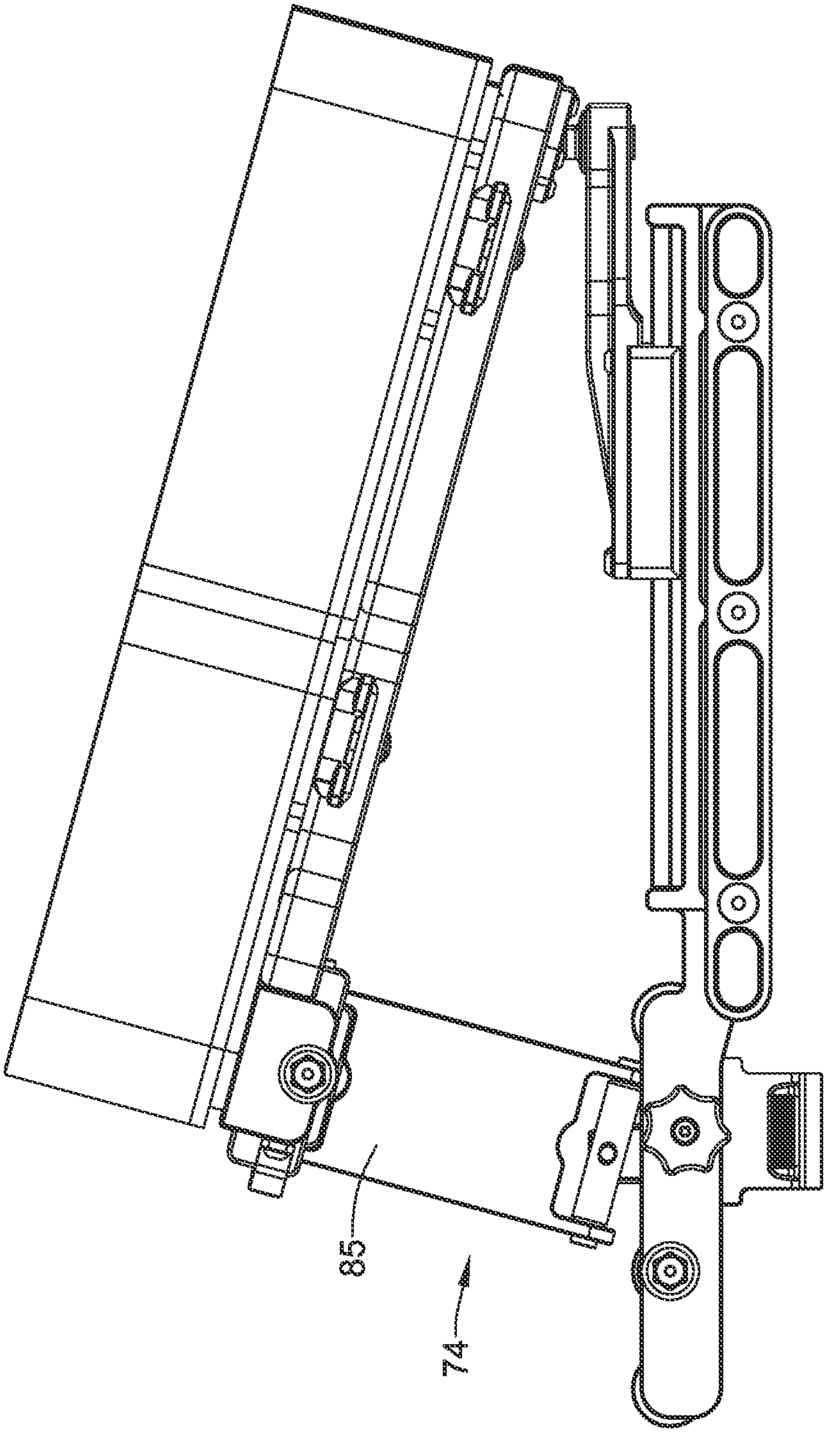
FIG. 29 is a side view of a portion of an example patient positioner.
Figure 30:
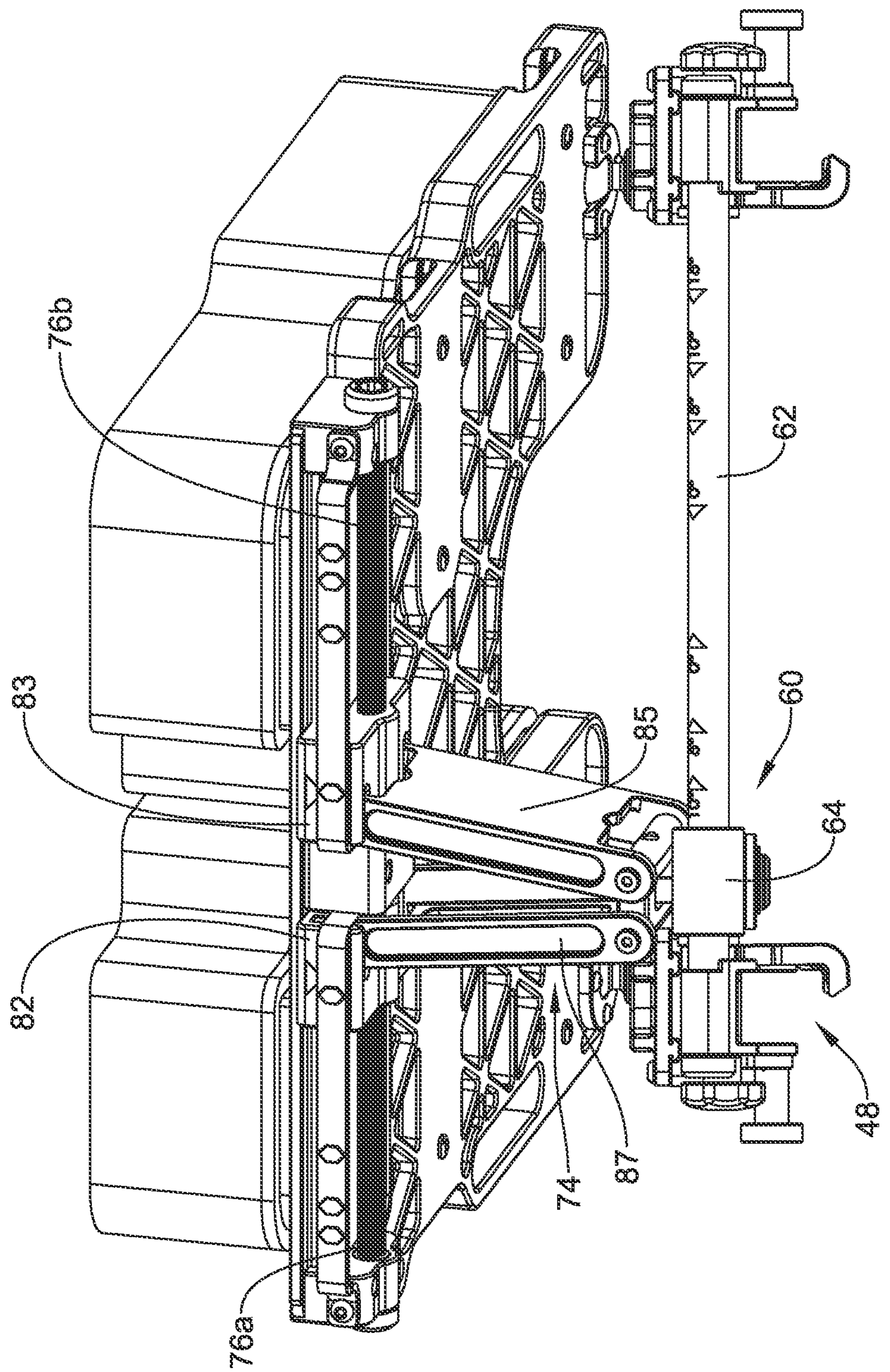
FIG. 30 is a perspective view of a portion of an example patient positioner.
Figure 31:
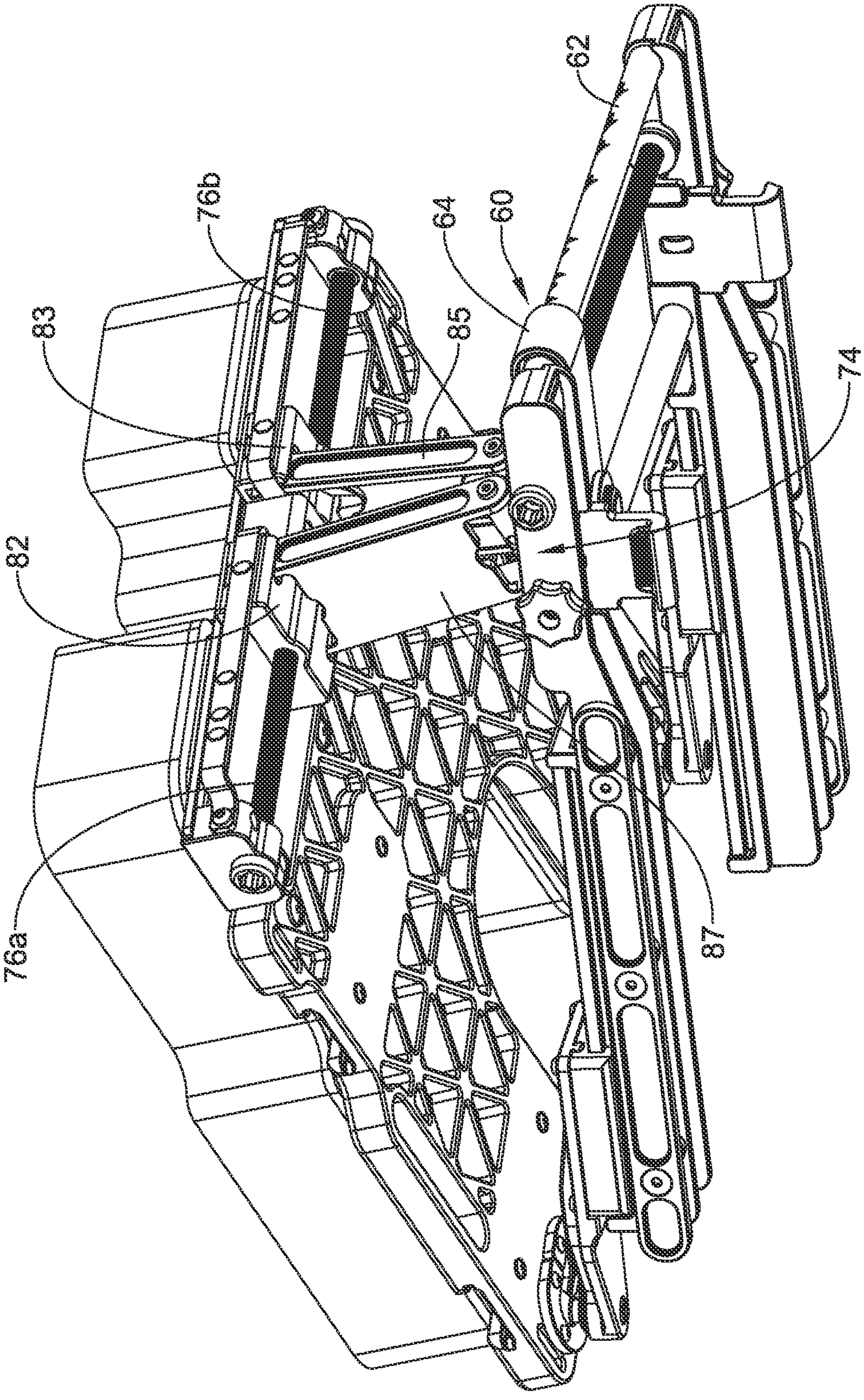
FIG. 31 is a perspective view of a portion of an example patient positioner.
Figure 32:
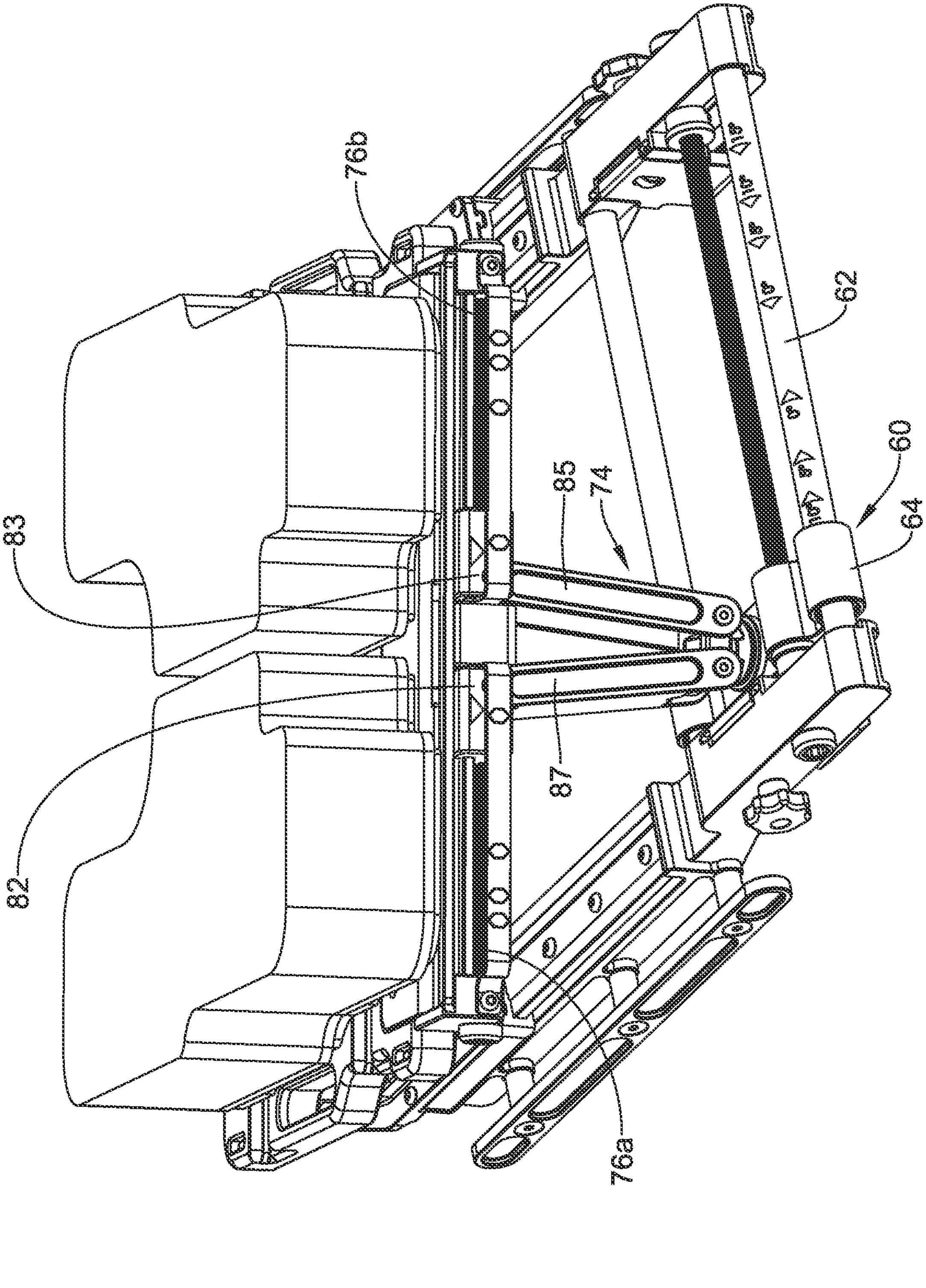
FIG. 32 is a perspective view of a portion of an example patient positioner.

A first lordosis carriage 82 may be disposed along the first rod section 76*a* and a second lordosis carriage 83 may be disposed along the second rod section 76*b*. A first scissor link 87 may extend between the first lordosis carriage 82 and the support housing 77. A second scissor link 85 may extend between the second lordosis carriage 83 and the support housing 77. The scissor links 87, 85 may be pivotably coupled to the lordosis carriages 82, 83. Actuation of one of the adjustment inputs 78*a*, 78*b* may cause the adjacent rod 76*a*, 76*b* to rotate. For example, rotation of the adjustment input 78*a* may cause the rod 76*a* to rotate. In turn, this may cause the carriage 82 to translate along the rod 76*a*, thereby causing the scissor link 87 to shift (e.g., toward a more vertical orientation). Likewise, the other adjustment input 78*b* can be actuated in a similar fashion to cause the scissor link 85 to shift (e.g., toward a more vertical orientation). FIGS. 27-29 illustrate the lordosis assembly 74 in a tilted or raised configuration. Here it can be seen that the scissor links 85, 87 are oriented in a more vertical arrangement. FIGS. 30-32 illustrate both the lateral rotation assembly 60 and the lordosis assembly 74 shifted.

In at least some instances, the lumbar support assembly 14 may allow for the patient to be shifted in multiple directions and/or planes. For example, the lumbar support assembly 14 may allow for a patient to be rotated (e.g., using the rotation assembly 60) and also to be raised/tilted (e.g., using the lordosis assembly 74).

One or more bolsters 84 may be coupled to the lumbar support assembly 14. The bolsters 84 may be similar in form and function to the bolsters 42. For example, the bolsters 84 may include an adjustment mechanism similar to that of the bolsters 42. In some instances, the lumbar support assembly 14 may include one, two, three, four, five, six, or more bolsters 84.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments. The invention's scope is, of course, defined in the language in which the appended claims are expressed.

What is claimed is:

1. A patient positioner, comprising:

a thoracic support assembly having one or more thoracic attachment members for securing the thoracic support member to a rail, the thoracic support assembly having a thoracic adjustment mechanism configured to shift the thoracic support assembly relative to the one or more thoracic attachment members;

a lumbar support assembly disposed adjacent to the thoracic support assembly, the lumbar support assembly including one or more lumbar attachment members for securing the lumbar support assembly to the rail;

wherein the lumbar support assembly includes a lumbar adjustment mechanism configured to shift the lumbar support assembly relative to the one or more lumbar attachment members; and a bolster coupled to at least one of the thoracic support assembly and the lumbar support assembly, the bolster including a ratchet mechanism for adjusting the position of the bolster relative to the at least one of the thoracic support assembly and the lumbar support assembly, wherein the lumbar adjustment mechanism includes a first threaded rod, a first carriage coupled to the first threaded rod, a second threaded rod, and a second carriage coupled to the second threaded rod.

2. The patient positioner of claim 1, wherein the thoracic adjustment mechanism is configured to rotate the thoracic support assembly relative to the one or more thoracic attachment members.

3. The patient positioner of claim 1, wherein the thoracic adjustment mechanism includes a threaded rod coupled to a pin.

4. The patient positioner of claim 1, wherein the lumbar adjustment mechanism is configured to rotate the lumbar support assembly relative to the one or more lumbar attachment members.

5. The patient positioner of claim 1, wherein the lumbar adjustment mechanism is configured to be adjusted by at least one of rotating the first threaded rod in a first direction and rotating the second threaded rod in the first direction.

6. The patient positioner of claim 1, wherein the lumbar adjustment mechanism includes a first scissor link coupled to the first carriage and a second scissor link coupled to the second carriage.

7. The patient positioner of claim 1, wherein the lumbar adjustment mechanism includes a ball joint.

8. The patient positioner of claim 1, wherein the lumbar adjustment mechanism is configured to adjust a patient spine lordosis.

9. The patient positioner of claim 1, wherein the thoracic adjustment mechanism includes an actuator disposed adjacent to a peripheral region of the one or more thoracic attachment members.

10. The patient positioner of claim 1, wherein the lumbar adjustment mechanism includes an actuator disposed adjacent to a peripheral region of the one or more lumbar attachment members.

11. The patient positioner of claim 1, further comprising a leg extension support member coupled to the lumbar support assembly.

12. The patient positioner of claim 11, wherein the leg extension support member is configured to rotate, translate, or both rotate and translate relative to the lumbar support assembly.

13. The patient positioner of claim 1, wherein the bolster includes a strap receiving region.

14. The patient positioner of claim 1, further comprising one or more additional bolsters.

15. A patient positioner, comprising:

a thoracic support assembly, the thoracic support assembly having a thoracic attachment member and a thoracic adjustment mechanism configured to shift the thoracic support assembly relative to the thoracic attachment member;

a lumbar support assembly including a lumbar attachment member, the lumbar support assembly including a lordosis adjustment member and a leg extension member, the lordosis adjustment member having a lordosis adjustment mechanism configured to shift the lordosis adjustment member relative to the lumbar attachment member; and one or more bolster coupled to the thoracic support assembly the lumbar support assembly, or both, wherein the lordosis adjustment mechanism includes a second threaded rod and a second carriage coupled to the second threaded rod.

16. The patient positioner of claim 15, wherein the lordosis adjustment mechanism includes a first threaded rod and a first carriage coupled to the first threaded rod.

17. The patient positioner of claim 7, wherein the lordosis adjustment mechanism is configured to be adjusted by rotating the first threaded rod in a first direction, rotating the second threaded rod in the first direction, or both.

18. The patient positioner of claim 17, wherein the first threaded rod and the second threaded rod are independently adjustable.

* * * * *